United States Patent
Breton et al.

(10) Patent No.: US 7,699,922 B2
(45) Date of Patent: Apr. 20, 2010

(54) ORGANIC PHASE CHANGE CARRIERS CONTAINING NANOPARTICLES, PHASE CHANGE INKS INCLUDING SAME AND METHODS FOR MAKING SAME

(75) Inventors: Marcel P. Breton, Mississauga (CA); Jennifer L. Belelie, Oakville (CA); Peter G. Odell, Mississauga (CA); Rina Carlini, Mississauga (CA); Adela Goredema, Mississauga (CA); H. Bruce Goodbrand, Hamilton (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 879 days.

(21) Appl. No.: 11/423,777

(22) Filed: Jun. 13, 2006

(65) Prior Publication Data
US 2007/0283846 A1 Dec. 13, 2007

(51) Int. Cl.
*C09D 11/02* (2006.01)
(52) U.S. Cl. .................................. 106/31.61; 106/31.29
(58) Field of Classification Search .................... 106/31
See application file for complete search history.

(56) References Cited

U.S. PATENT DOCUMENTS

| | | | |
|---|---|---|---|
| 4,889,560 A | 12/1989 | Jaeger et al. | |
| 4,889,761 A | 12/1989 | Titterington et al. | |
| 5,221,335 A | 6/1993 | Williams et al. | |
| 5,372,852 A | 12/1994 | Titterington et al. | |
| 5,496,879 A | 3/1996 | Griebel et al. | |
| 5,621,022 A | 4/1997 | Jaeger et al. | |
| 5,783,657 A * | 7/1998 | Pavlin et al. | 528/310 |
| 5,998,570 A | 12/1999 | Pavlin et al. | |
| 6,111,055 A | 8/2000 | Berger et al. | |
| 6,320,018 B1 | 11/2001 | Sijbesma et al. | |
| 6,447,974 B1 * | 9/2002 | Chen et al. | 430/137.14 |
| 6,467,897 B1 | 10/2002 | Wu et al. | |
| 6,471,758 B1 * | 10/2002 | Kelderman et al. | 106/31.29 |
| 6,761,758 B2 | 7/2004 | Boils-Boissier et al. | |
| 6,835,833 B2 | 12/2004 | Boils-Boissier et al. | |
| 6,841,589 B2 | 1/2005 | Schmidt et al. | |
| 6,989,052 B1 | 1/2006 | Wu et al. | |
| 7,026,368 B2 | 4/2006 | Yamada et al. | |
| 2003/0040551 A1 * | 2/2003 | Yamaguchi et al. | 523/113 |
| 2005/0080163 A1 | 4/2005 | Schmidt et al. | |
| 2007/0119340 A1 * | 5/2007 | P. Breton et al. | 106/31.43 |
| 2007/0120909 A1 * | 5/2007 | Belelie et al. | 347/88 |
| 2007/0120921 A1 * | 5/2007 | Carlini et al. | 347/100 |
| 2007/0123722 A1 * | 5/2007 | Toma et al. | 554/36 |
| 2007/0123723 A1 * | 5/2007 | Odell et al. | 554/36 |

FOREIGN PATENT DOCUMENTS

| | | |
|---|---|---|
| DE | 4205636 AL | 8/1993 |
| DE | 4205713 AL | 8/1993 |
| WO | WO98/17704 | 4/1998 |
| WO | WO02053659 | 7/2002 |

OTHER PUBLICATIONS

U.S. Appl. No. 11/181,632, Goredema et al.
U.S. Appl. No. 11/291,592, Goredema et al.
U.S. Appl. No. 11/291,540, Breton et al.
U.S. Appl. No. 11/291,283, Breton et al.
U.S. Appl. No. 11/291,315, Breton et al.
U.S. Appl. No. 11/290,122, Toma et al.
U.S. Appl. No. 11/289,882, Toma et al.
U.S. Appl. No. 11/290,265, Snyder et al.
U.S. Appl. No. 11/301,732, Wong et al.
U.S. Appl. No. 11/034,866, Breton et al.
U.S. Appl. No. 11/289,521, Belelie et al.
U.S. Appl. No. 11/290,098, Belelie et al.
U.S. Appl. No. 11/290,207, Odell et al.
U.S. Appl. No. 11/289,473, Carlini et al.
Krysztakewicz et al., in Pigment and Resin Technology, vol. 32, No. 3, 2003, pp. 149-159.

* cited by examiner

*Primary Examiner*—Jerry Lorengo
*Assistant Examiner*—Yun Qian
(74) *Attorney, Agent, or Firm*—Marger Johnson & McCollom, P.C.

(57) ABSTRACT

Disclosed is an organic phase change carrier and a method for forming same, and a phase change ink including same. The organic phase change carrier comprises a colloidal dispersion of nanoparticles exhibiting a substantially uniform distribution of said nanoparticles discretely distributed therewithin, at least one curable monomer; a phase change inducing component, and an initiator. The organic phase change carrier exhibits a substantially uniform distribution of the nanoparticles so that they are discretely distributed therewithin, and are substantially resistant to the aggregation of the nanoparticles distributed therewithin.

28 Claims, No Drawings

ORGANIC PHASE CHANGE CARRIERS CONTAINING NANOPARTICLES, PHASE CHANGE INKS INCLUDING SAME AND METHODS FOR MAKING SAME

CROSS-REFERENCE TO RELATED APPLICATIONS

Copending application U.S. Ser. No. 11/181,632, filed Jul. 13, 2005, entitled "Ink Carriers, Phase Change Inks Including Same and Methods for Making Same," with the named inventors Adela Goredema, Christine E. Bedford, Marcel P. Breton, and Chris A. Wagner, the disclosure of which is totally incorporated herein by reference, discloses an ink carrier comprising an ester terminated oligo-amide material having a substantially low polydispersity. This ink carrier can be combined with a colorant to produce an ink composition.

Copending Application U.S. Ser. No. 11/291,592 filed Nov. 30, 2005, entitled "Phase Change Inks and Methods for Making Same," with the named inventors Adela Goredema, Christine E. Bedford, Marcel P. Breton, and Christopher A. Wagner, the disclosure of which is totally incorporated herein by reference, discloses a phase change ink composition and a method for forming the ink composition. The phase change ink composition comprises (1) an ink carrier comprising (A) a first component which comprises a monoester wax or blend of monoesters having at least one alkyl group comprising at least 10 carbon atoms, and (B) a second component which comprises a polyalkylene wax, and (2) a urea gellant, and (3) a colorant.

Copending application U.S. Ser. No. 11/291,540, filed Nov. 30, 2005, entitled "Ink Carriers Containing Nanoparticles, Phase Change Inks Including Same and Methods for Making Same," with the named inventors Marcel P. Breton, Adela Goredema, Christine E. Bedford, Christopher A. Wagner, Sandra Gardner, Nan-Xing Hu, and Bruce Goodbrand, the disclosure of which is totally incorporated herein by reference, discloses an ink carrier and a method for forming same, and a phase change ink including same. The ink carrier comprises a colloidal dispersion of at least one of silica nanoparticles and metal oxide particles. The ink carrier can also include a low melting wax, and a gelling agent. The ink carrier exhibits a substantially uniform distribution of the nanoparticles so that they are discretely distributed therewithin, and are substantially resistant to the aggregation of the nanoparticles distributed therewithin.

Copending application U.S. Ser. No. 11/291,283, filed Nov. 30, 2005, entitled "Black Inks and Method for Making Same," with the named inventors Marcel P. Breton, Raymond W. Wong, Christine E. Bedford, Christopher Wagner, and Caroline Turek, the disclosure of which is totally incorporated herein by reference, discloses a phase change black ink composition comprising (1) a low polarity ink carrier comprising (A) an ester-terminated polyamide, (B) a Guerbet alcohol or a Guerbet alcohol mixture containing at least one linear alcohol, and (C) a low polarity wax, and (2) a black colorant. The ink carrier can also contain a dispersant. The ink is resistant to aggregation and settling of the black colorant when a standby-mode printer temperature for the ink is not more than about the gel temperature of the ink.

Copending application U.S. Ser. No. 11/291,315, filed Nov. 30, 2005, entitled "Ink Carriers, Phase Change Inks Including Same and Methods for Making Same," with the named inventors Marcel P. Breton, Adela Goredema, Christine E. Bedford, Christopher A. Wagner, Stephan Drappel, Caroline Turek, Raymond W. Wong, and Nadia Edun, the disclosure of which is totally incorporated herein by reference, discloses an ink carrier comprising (A) an antioxidant mixture comprising (a) a hindered phenol antioxidant, and (b) a hindered amine antioxidant, (B) a polyalkylene wax, (C) a functional wax, and (D) an ester-terminated amide. The low polarity ink carrier is substantially resistant to phase separation, has excellent thermal stability, resists autocatalytic degradation of the ink composition and a substantial color shift upon standing, and provides enhanced humidity resistance. This ink carrier can be combined with a colorant to produce an ink composition.

Copending application U.S. Ser. No. 11/290,122, filed Nov. 30, 2005, entitled "Curable Amide Gellant Compounds," with the named inventors Eniko Toma, Peter G. Odell, Adela Goredema, and Jennifer L. Belelie, the disclosure of which is totally incorporated herein by reference, discloses a compound of the formula

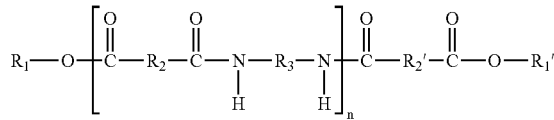

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1.

Copending application U.S. Ser. No. 11/289,882, filed Nov. 30, 2005, entitled "Process for Making Curable Amide Gellant Compounds," with the named inventors Eniko Toma, Adela Goredema, Jennifer L. Belelie, and Peter G. Odell, the disclosure of which is totally incorporated herein by reference, discloses a process for preparing a compound of the formula

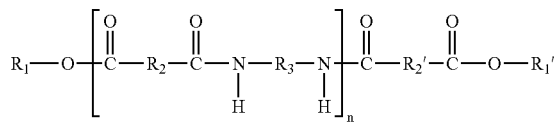

wherein $R_1$ is an alkyl group having at least one ethylenic unsaturation, an arylalkyl group having at least one ethylenic unsaturation, or an alkylaryl group having at least one ethylenic unsaturation, $R_2$ and $R_3$ each, independently of the others, are alkylene groups, arylene groups, arylalkylene groups, or alkylarylene groups, and n is an integer representing the number of repeat amide units and is at least 1, said process comprising: (a) reacting a diacid of the formula

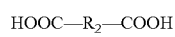

with a diamine of the formula

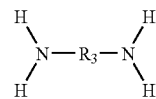

in the presence of a catalyst, a solvent, and a coupling agent to form an oligoamide intermediate of the formula

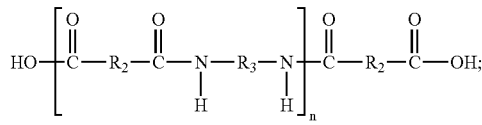

and (b) reacting the oligoamide intermediate with an alcohol of the formula $$R_1—OH$$

to form the product.

Copending application U.S. Ser. No. 11/290,265, filed Nov. 30, 2005, entitled "Phase Change Inks," with the named inventors Trevor J. Snyder, Bo Wu, Patricia Ann Wang, Donald R. Titterington, Jule W. Thomas, Jr., Randall R. Bridgeman, and Mark H. Tennant, the disclosure of which is totally incorporated herein by reference, which discloses hot melt or phase change inks and methods for the use thereof. More specifically, disclosed are hot melt or phase change inks particularly suitable for use in phase change ink jet printing processes with reduced energy requirements. One embodiment is directed to a phase change ink composition comprising an ink carrier and a colorant, said ink being suitable for use in an indirect printing process wherein the ink is jetted from a printhead onto a heated intermediate transfer member and subsequently transferred from the intermediate transfer member to a final recording substrate, wherein: (a) the ink can be jetted from the printhead onto the intermediate transfer member when the ink is maintained at a temperature of about 125° C. or lower; (b) the ink can be jetted without purging from a printer maintained at a standby temperature of about 100° C. or lower; and (c) the ink has a cohesive failure temperature of at least about 56° C.

Copending application U.S. Ser. No. 11/301,732 filed Dec. 12, 2005, entitled "Carbon Black Inks and Method for Making Same," with the named inventors Raymond Wong, Marcel P. Breton, Christine E. Bedford, Adela Goredema, and Caroline Turek, the disclosure of which is totally incorporated herein by reference, which discloses carbon black phase change inks and methods for making same. In one embodiment the carbon black phase change ink composition can comprise (1) a low polarity ink carrier comprising (A) a low polarity wax, and optionally (B) an ester-terminated polyamide, (2) a dispersant, and (3) a carbon black colorant.

Other copending applications include the following: U.S. Ser. No. 11/034,866, filed Jan. 14, 2005, entitled "Radiation Curable Inks Containing Curable Gelator Additives," with the named inventors Marcel P. Breton et al.; U.S. Ser. No. 11/289,521, filed Nov. 30, 2005, entitled "Curable Phase Change Compositions and Methods for Using Such Compositions," with the named inventors Jennifer L. Belelie et al.; U.S. Ser. No. 11/290,098, filed Nov. 30, 2005, entitled "Phase Change Inks Containing Curable Isocyanate-derived Compounds and Phase Change Inducing Compounds," with the named inventors Jennifer L. Belelie et al.; U.S. Ser. No. 11/290,122, filed Nov. 30, 2005, entitled "Curable Amide Gellant Compounds," with the named inventors Eniko Toma et al.; U.S. Ser. No. 11/290,207, filed Nov. 30, 2005, entitled "Photoinitator with Phase Change Properteis and Gellant Affinity," with the named inventors Peter G. Odell et al.; and U.S. Ser. No. 11/289,473, filed Nov. 30, 2005, entitled "Radiation Curable Phse Change Inks Containing Curable Epoxy-polyamide Composite Gellants," with the named inventors Rina Carlini et al.

BACKGROUND

Disclosed herein are organic phase change carriers, phase change inks and methods for making same. More specifically, disclosed herein are organic phase change carriers and phase change inks including nanoparticles which can be used in direct and indirect printing processes. In one embodiment, the phase change inks are of the low energy type. The organic phase change carriers (1) comprise (A) a colloidal dispersion of nanoparticles, the organic phase change carrier exhibiting a substantially uniform distribution of said nanoparticles therewithin, with a substantially reduced aggregation of the nanoparticles distributed therewith. The organic phase change carrier also includes (B) at least one curable monomer, and (C) a phase change inducing agent and (D) an initator. The phase change inducing agent can be at least one of (a) a gellant or (b) a solid alcohol compound. An embodiment of this disclosure is directed to a phase change ink which comprises the above-described organic phase change carrier (1) and (2) a colorant.

Another embodiment is directed to a method which comprises (a) incorporating into an ink jet printing apparatus the above-described phase change ink composition (b) melting the ink; (c) causing droplets of the melted ink to be ejected in an imagewise pattern onto an intermediate transfer member; and (d) transferring the ink in the imagewise pattern from the intermediate transfer member to a final recording substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change organic phase change carrier composition which is combined with a phase change ink compatible colorant. In a specific embodiment, a series of colored phase change inks can be formed by combining organic phase change carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (commercially available from C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change organic phase change carrier compositions are known and are described in U.S. Pat. No. 6,989,052, the disclosure of which is totally incorporated herein by reference.

U.S. Pat. Nos. 5,783,657, 5,998,570 and WO 98/17704, (Pavlin et al), the disclosures of each of which are totally incorporated herein by reference, disclose a low molecular weight, ester-terminated polyamide that may be blended with a liquid hydrocarbon to form a transparent composition having gel consistency. The ester-terminated polyamide is prepared by reacting "x" equivalents of dicarboxylic acid wherein at least 50% of those equivalents are from polymerized fatty acid, "y" equivalents of diamine such as ethylene diamine, and "z" equivalents of monoalcohol having at least 4 carbon atoms. The stoichiometry of the reaction mixture is such that $0.9 \leq \{x/(y+z)\} \leq 1.1$ and $0.1 \leq \{z/(y+z)\} \leq 0.7$. The reactants are heated until they reach reaction equilibrium.

U.S. Pat. No. 6,111,055 (Berger, et al), the disclosure of which is totally incorporated herein by reference, discloses an ester terminated dimer acid-based polyamide which is blended with a solvent to form a gel. The solvent may be flammable, and a wick may be added to the resulting gel to form a candle. The said ester terminated dimeracid-based polyamide is prepared by thermal condensation of a diacid, a diamine and a monoalcohol.

U.S. application Ser. No. 11/289,521 (filed Nov. 30, 2005), the disclosure of which is totally incorporated herein by reference, discloses a composition, comprising: (a) curable monomer; (b) photoinitiator that initiates polymerization of said curable monomer; and (c) phase change agent that provides the composition with an increase in viscosity. The viscosity increase is of at least about four orders of magnitude, from a first temperatureof from about 50° C. to 130° C., to a second temperatureof from about 0° C. to 70° C., the second temperature being at least about 10° C. below the first temperature.

U.S. application Ser. No. 11/290,098 (filed Nov. 30, 2005), the disclosure of which is totally incorporated herein by reference, discloses a phase change ink comprising a colorant, an initiator, and a phase change ink carrier, said carrier comprising (A) a compound which is the reaction product of a mixture comprising (1) an isocyanate; and (2) a component comprising (a) an alcohol having at least one ethylenic unsaturation; (b) an amine having at least one ethylenic unsaturation; (c) an acid having at least one ethylenic unsaturation; or (d) mixtures thereof, and (B) a phase change inducing component, said phase change inducing component containing at least one hydroxyl group, said phase change inducing component having a melting point of about 40° C. or higher.

U.S. application Ser. No. 11/291,540 (filed Nov. 30, 2005), the disclosure of which is totally incorporated herein by reference, discloses ink carriers and phase change inks including nanoparticles which can be used in direct and indirect printing processes. The ink carrier can also include at least one of (B) a low melting wax, and (C) a gelling agent.

U.S. application Ser. No. 11/289,473 (filed Nov. 30, 2005), the disclosure of which is totally incorporated herein by reference, which is directed to a radiation curable phase change ink which can be used in piezoelectric ink jet devices including an ink vehicle that includes at least one curable epoxypolyamide gellant, and at least one colorant. The use of the gellant enables the ink to form a gel state having a viscosity of at least $10^3$ mPa·s at very low temperatures of from about 25° C. to about 100° C.

U.S. application Ser. No. 11/290,122 (filed Nov. 30, 2005), the disclosure of which is totally incorporated herein by reference, discloses a compound of the formula

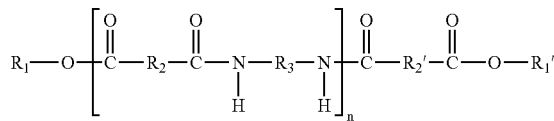

wherein $R_1$ and $R_1'$ each, independently of the other, is an alkyl group having at least one ethylenic unsaturation, an arylalkyl group having at least one ethylenic unsaturation, or an alkylaryl group having at least one ethylenic unsaturation, $R_2$, $R_2'$, and $R_3$ each, independently of the others, are alkylene groups, arylene groups, arylalkylene groups, or alkylarylene groups, and n is an integer representing the number of repeat amide units and is at least 1.

U.S. application Ser. No. 11/290,207 (filed Nov. 30, 2005), the disclosure of which is totally incorporated herein by reference, discloses a compound of the formula

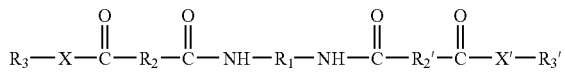

wherein $R_1$ is an alkylene, arylene, arylalkylene, or alkylarylene group, $R_2$ and $R_2'$ each, independently of the other, are alkylene, arylene, arylalkylene, or alkylarylene groups, $R_3$ and $R_3'$ each, independently of the other, are either (a) photoinitiating groups, or (b) groups which are alkyl, aryl, arylalkyl, or alkylaryl groups, provided that at least one of $R_3$ and $R_3'$ is a photoinitiating group, and X and X' each, independently of the other, is an oxygen atom or a group of the formula —$NR_4$—, wherein $R_4$ is a hydrogen atom, an alkyl group, an aryl group, an arylalkyl group, or an alkylaryl group.

Many phase change inks currently being used in solid ink jet piezoelectric printers employ high jetting temperatures (about 140° C.) and long warm up times. The images currently produced by these inks can also, in some instances, exhibit poor scratch resistance and image permanence.

Therefore, a need remains for improved phase change inks, and more specifically, low energy solid inks which permit phase change ink jet printers to perform at more moderate operating conditions than with conventional phase change inks. For example, a need exists for phase change inks which can be jetted at temperatures lower than conventional jetting temperatures as described below. Also, there is a need for phase change inks having improved transfuse latitude and low stand-by energy. In addition, a need remains for phase change inks which exhibit robustness, that is resistance to scratch, crease and abrasion with substantially no smear. There is also a need for phase change inks that can exhibit at least some of the above advantages with reduced energy requirements while printing. Additionally, a need remains for phase change inks that print successfully on paper and transparency stock. Furthermore, there is a need for phase change inks that generate prints with good performance in automatic document feeders.

SUMMARY

Disclosed herein is an organic phase change carrier which is used in forming a phase change ink composition, the organic phase change carrier comprising (A) a colloidal dispersion of at least one of nanoparticles. The organic phase change carrier also includes (B) at least one curable monomer, (C) a phase change inducing agent, and (D) an intiator.

Also disclosed herein are low energy solid inks comprising the organic phase change carrier described above. The inks exhibit a substantially high degree of nanoparticle uniformity and a substantially reduced degree of nanoparticle aggregation.

A method can also be provided which comprises forming the above-described ink by combining the colloidal dispersion of nanoparticles with other organic phase change carrier components. Another embodiment of this disclosure is directed to a method which comprises (a) incorporating into an ink jet printing apparatus an ink composition comprising (1) the above-described organic phase change carrier and (2) a colorant; (b) melting the ink; and (c) causing droplets of the melted ink to be ejected in an imagewise pattern onto a substrate.

DETAILED DESCRIPTION

The organic phase change carrier (1) of this disclosure comprises (A) a colloidal dispersion of nanoparticles. The organic phase change carrier also includes (B) at least one curable monomer, (C) a phase change inducing agent, and (D) an intiator. Phase change inks can comprise the above-described organic phase change carrier (1) and (2) a colorant. The phase change ink can have a substantially low surface energy.

Nanometer sized particles, typically in the form of a colloidal dispersion of the nanoparticles, can be provided to control the transfuse properties of the inks. In one embodiment, the nanoparticles are at least one of silicon nanoparticles and metal oxide nanoparticles. The surface properties of these particles can be chemically modified so as to produce ink-particle composites that have gel-like properties under specific temperature conditions usually below the selected jetting temperature and liquid-like properties at or above the jetting temperature. The colloidal dispersion of the nanoparticles are combined with the organic phase change carrier so that there is a substantially uniform distribution of the nanoparticles within the ink matrices. Moreover, the ink is formed with a substantially reduced aggregation of the nanoparticles so that they are discretely distributed.

The nanoparticles can be used as an ink stabilizer. In this case, they can act as a nucleus for alignment of the organic phase change carrier. In one embodiment, the nanoparticles can be aligned along the network formed by the phase change inducing component. This results in these inks having a unique morphology associated with the use of nanoparticles in which they can be self aligned and is resistant to substantial aggregation in the ink matrix. The alignment of the particles can be along the phase separated gel fibers and can be formed upon cooling. More particularly, the aligning of the nanoparticles can occur within the organic phases change carrier.

The nanoparticles can, in an embodiment herein, be dispersed in a solvent, such as a low boiling solvent, and can then be transferred from the solvent phase to the ink vehicles where they are uniformly disseminated in the organic phase change carrier and in the low energy phase change ink. The solvent can in one embodiment be an organic solvent, and in another embodiment be a low boiling organic solvent. These solvents in one embodiment have a boiling point of equal to or less than about 150° C., in another embodiment have a boiling point of equal to or less than about 130° C., and in a further embodiment have a boiling point equal to or less than about 100° C., although the boiling point can be outside of these ranges. In one embodiment these solvents can be low boiling alcohols, glycols, glycol ethers, glycol acetates, ketones, acetamides, and the like, as well as mixtures thereof. In another embodiment, these solvents can be methanol, isopropanol, ethylene glycol, ethylene glycol mono-n-propyl ether, methyl ethyl ketone, methyl isobutyl ketone, propylene glycol mono-methyl ether acetate, N,N-dimethyl acetamide, and the like, as well as mixtures thereof.

In another further embodiment, silica colloidal dispersions are commercially available from Nissan Chemicals America as ORGANOSILICASOL™ compounds. In still another embodiment these ORGANOSILICASOL™ compounds can include ORGANOSILICASOL™ MT-ST,
ORGANOSILICASOL™ MA-ST-MS,
ORGANOSILICASOL™ IPA-ST,
ORGANOSILICASOL™ IPA-ST-MS,
ORGANOSILICASOL™ IPA-ST-L,
ORGANOSILICASOL™ IPA-ST-ZL,
ORGANOSILICASOL™ IPA-ST-UP,
ORGANOSILICASOL™ EG-ST,
ORGANOSILICASOL™ NPC-ST-30,
ORGANOSILICASOL™ MEK-ST,
ORGANOSILICASOL™ MIK-ST-MS,
ORGANOSILICASOL™ MIBK-ST,
ORGANOSILICASOL™ PMA-ST, and
ORGANOSILICASOL™ DMAC-ST These low boiling solvent components respectively correspond to the following compounds: methanol, isopropanol, ethylene glycol, ethylene glycol mono-n-propyl ether, methyl ethyl ketone, methyl isobutyl ketone, propylene glycol monomethyl ether acetate, or N,N-dimethyl acetamide.

The loading of nanoparticles in the solvent in one embodiment is at at least about 15% by weight, in another embodiment is at at least about 20% by weight, and in a further embodiment is at least about 25% by weight, in one embodiment equal to or less than about 45 weight percent, in another embodiment equal to or less than about 40% by weight, and in a further embodiment equal to or less than about 35% by weight, although the loading can be outside of these ranges.

The nanoparticles are of any desired or effective particle size, in one embodiment having a particle size equal to or less than about 500 nm, in another embodiment having a particle size equal to or less than about 300 nm, and in yet another embodiment having a particle size equal to or less than about 100 nm, although the particle size can be outside of these ranges.

The nanoparticles (dry-weight) are present in the organic phase change carrier in any desired or effective amount. In one embodiment of at least about 1% by weight of the ink, in another embodiment of at least about 5% by weight of the ink, and in yet another embodiment of at least about 10% by weight of the ink, and in one embodiment equal to or less than about 40% by weight of the ink, in another embodiment equal to or less than about 35% by weight of the ink, and in yet another embodiment equal to or less than about 25% by weight of the ink, although the amount can be outside of these ranges.

In another embodiment, the nanoparticles selected can be metal-oxide particles such as those commercially available from Nanophase Technologies: Nano Tek™ Aluminum Oxide, Nano Tek™ Antimony Tin Oxide and Nano Tek™ Zinc Oxide, the particles being prepared by a Physical Vapor Synthesis (PVS). These particles can be modified by Nanophase through a discrete particle encapsulation process to enhance their dispersability in various vehicles.

In a further embodiment, the Nano Tek particles can be modified through a sol-gel process to form particles that can be easily dispersed in the curable phase change inks disclosed herein. The inorganic particles can be added to a solvent such as toluene. From about 5 and equal to or less than 20 weight % of a silicon ester or mixture of silicon esters can be added. Mono, di and tri-alkoxy esters can be employed. The dispersion can then be subjected to high intensity sonication to initiate the sol-gel chemistry. No acid or base catalyst needs to be employed as the surface absorbed water acts to initiate hydrolysis under this high energy acoustical agitation. Hydrolysis and condensation can then proceed resulting in a surface passivation of the particles. After this treatment, the particles can form an optically transparent dispersion which shows substantially no tendency to settle.

In an additional embodiment, the Nano Tek™ particles are modified to produce on the surface moieties that have strong H-bonding capabilities. In such an embodiment these particles can be tecton-modified nanoparticles.

In yet another embodiment, the tecton-modified nanoparticles can be functionalized so as to contain monomer that can participate in certain polymerization reactions such as, for example, UV or thermally initiated polymerization processes.

The tecton structures are disclosed for example in patent application Xerox reference A3595-US-NP, MJM Do. No. 9840-004, U.S. application Ser. No. 11/291,540, and in Xerox U.S. Pat. Nos. 6,835,833 and 6,761,758, the disclosures of each of which are totally incorporated herein by reference, e.g.: structure below, where R, R1, R2, etc. are modified so as to be able to react with the nanoparticle selected. As a variation from the tecton structure, hydroxyethylacrylate or hydroxyethyl methacrylate can be reacted with the isocyanate group to provide a silica nanoparticle that participates in the cure of acrylate inks. A version that participates in a cationic cure can also be devised.

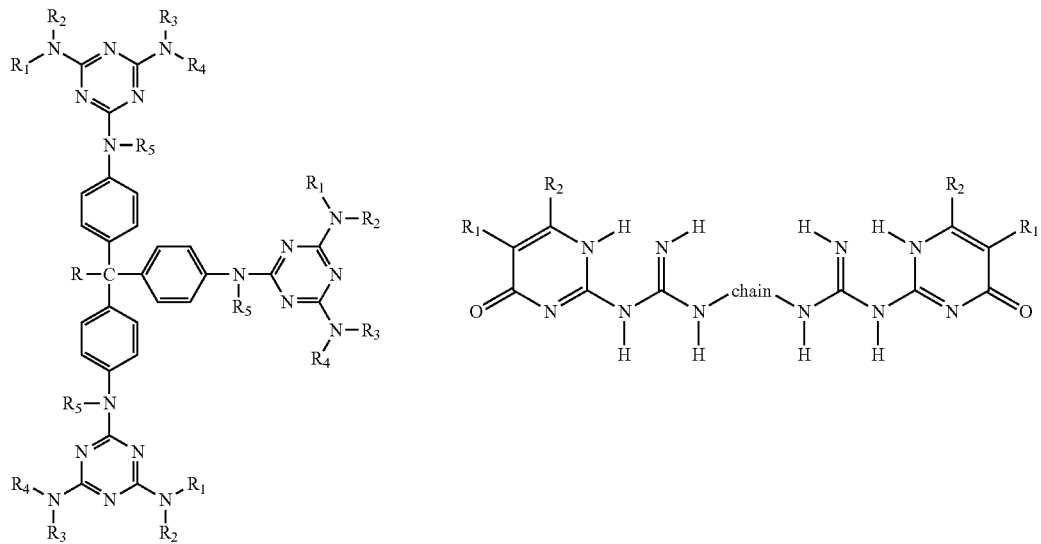

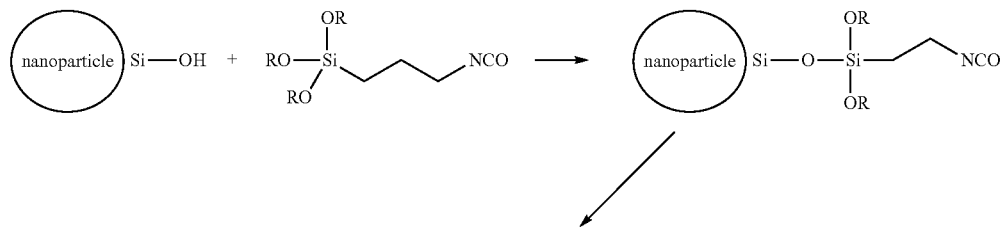

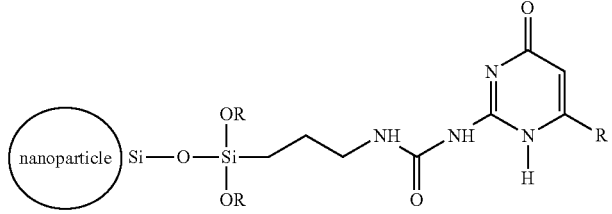

In another embodiment, the nanoparticles are colloidal antimonyl pentoxide surface treated particles with ethoxylated amides, such materials being available from Nyacol Nanotehcnologies Inc., Ashland, Mass., and sold under tradenames ADP 480 and ADP 494.

The UV curable functionalized nanoparticles can be employed in the ink carrier disclosed herein in any desired or effective amount, in one embodiment of at least about 0.1% by weight of the ink, in another embodiment of at least about 5% by weight of the ink, and in yet another embodiment of at least about 10% by weight of the ink, and in one embodiment equal to or less than about 40% by weight of the ink, in another embodiment equal to or less than about 35% by weight of the ink, and in yet another embodiment equal to or less than about 25% by weight of the ink, although the amount can be outside of these ranges.

The organic phase change carrier can include (B) at least one curable monomer. Examples of additional suitable ink carrier materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation)), trimethylolpropane triacrylate, glycerol propoxylate triacrylate, dipentaerythritol pentaacrylate, dipentaerythritoi hexaacrylate, ethoxylated pentaerythritol tetraacrylate (available from Sartomer Co. Inc. as SR 494), and the like, as well as mixtures thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

The compounds disclosed herein are the reaction product of a mixture comprising (1) an isocyanate; and (2) a component comprising (a) an alcohol having at least one ethylenic unsaturation; (b) an amine having at least one ethylenic unsaturation; (c) an acid having at least one ethylenic unsaturation; or (d) mixtures thereof. These reaction products can include amides, ureas, urethanes, urea/urethanes, amide/urethanes, and the like, as well as mixtures thereof. For example, the reaction products of an alcohol and an isocyanate can include urethanes. The reaction products of an amine and an isocyanate can include ureas. The reaction products of an acid and an isocyanate can include amides. The reaction products of an isocyanate and a mixture of an alcohol and an amine can include urea-urethanes. The reaction products of an isocyanate and a mixture of an acid and an alcohol can include amide-urethanes.

Suitable isocyanates include monomeric, oligomeric, and polymeric isocyanates, including (but are not limited to) those of the general formula $R_1—(NCO)_n$ wherein $R_1$ is (i) an alkyl or alkylene group (including linear and branched, saturated and unsaturated, cyclic and acyclic, and substituted and unsubstituted alkyl and alkylene groups, and wherein heteroatoms, such as oxygen, nitrogen, sulfur, silicon, phosphorus, and the like either may or may not be present in the alkyl or alkylene group), in one embodiment with at least about 8 carbon atoms, in another embodiment with at least about 10 carbon atoms, and in yet another embodiment with at least about 12 carbon atoms, and in one embodiment with no more than about 60 carbon atoms, in another embodiment with no more than about 50 carbon atoms, and in yet another embodiment with no more than about 40 carbon atoms, although the number of carbon atoms can be outside of these ranges, (ii) an aryl or arylene group (including substituted and unsubstituted aryl and arylene groups, and wherein heteroatoms, such as oxygen, nitrogen, sulfur, silicon, phosphorus, and the like either may or may not be present in the aryl or arylene group), in one embodiment with at least about 5 carbon atoms, and in another embodiment with at least about 6 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, (iii) an arylalkyl or arylalkylene group (including substituted and unsubstituted arylalkyl and arylalkylene groups, wherein the alkyl portion of the arylalkyl or arylalkylene group can be linear or branched, saturated or unsaturated, cyclic or acyclic, and substituted or unsubstituted, and wherein heteroatoms, such as oxygen, nitrogen, sulfur, silicon, phosphorus, and the like either may or may not be present in either the aryl or the alkyl portion of the arylalkyl or arylalkylene group), in one embodiment with at least about 6 carbon atoms, and in another embodiment with at least about 7 carbon atoms, and in one embodiment with no more than about 60 carbon atoms, in another embodiment with no more than about 40 carbon atoms, and in yet another embodiment with no more than about 30 carbon atoms, although the number of carbon atoms can be outside of these ranges, or (iv) an alkylaryl or alkylarylene group (including substituted and unsubstituted alkylaryl and alkylarylene groups, wherein the alkyl portion of the alkylaryl or alkylarylene group can be linear or branched, saturated or unsaturated, cyclic or acyclic, and substituted or unsubstituted, and wherein heteroatoms, such as oxygen, nitrogen, sulfur, silicon, phosphorus, and the like either may or may not be present in either the aryl or the alkyl portion of the alkylaryl or alkylarylene group), in one embodiment with at least about 6 carbon atoms, and in another embodiment with at least about 7 carbon atoms, and in one embodiment with no more than about 60 carbon atoms, in another embodiment with no more than about 40 carbon atoms, and in yet another embodiment with no more than about 30 carbon atoms, although the number of carbon atoms can be outside of these ranges, wherein the substituents on the substituted alkyl, alkylene, aryl, arylene, arylalkyl, arylalkylene, alkylaryl, and alkylarylene groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, mixtures thereof, and the like, wherein two or more substituents can be joined together to form a ring, and n is an integer representing the number of isocyanate groups, being, for example, 1, 2, 3, or the like in the instance of monomeric isocyanates and having no necessary upper limit in the case of polymeric isocyanates.

Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include n-octadecylisocyanate, of the formula

CH$_3$—(CH$_2$)$_{17}$—NCO other isomers of octadecylisocyanate; hexadecylisocyanate; octylisocyanate; n-butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI), of the formula

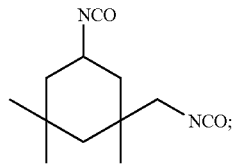

toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), of the formula

OCN—(CH$_2$)$_6$—NCO naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; 2,2,4-trimethylhexamethylene diisocyanate and 2,4,4-trimethylhexamethylene diisocyanate, of the formulae

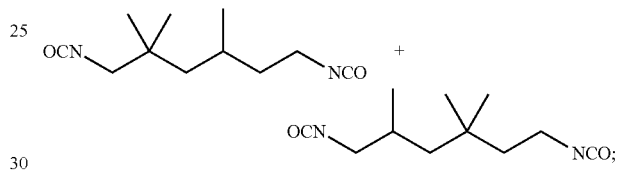

tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanate and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Examples of suitable acids include any ethylenically unsaturated acid, including (but not limited to) those of the formula R$_2$—COOH wherein R$_2$ is (i) an alkyl group having at least one ethylenic unsaturation therein (including linear and branched, cyclic and acyclic, and substituted and unsubstituted alkyl groups, and wherein heteroatoms, such as oxygen, nitrogen, sulfur, silicon, phosphorus, and the like either may or may not be present in the alkyl group), in one embodiment with at least about 2 carbon atoms, in another embodiment with at least about 4 carbon atoms, in yet another embodiment with at least about 6 carbon atoms, and in still another embodiment with at least about 10 carbon atoms, and in one embodiment with no more than about 40 carbon atoms, in another embodiment with no more than about 30 carbon atoms, in yet another embodiment with no more than about 22 carbon atoms, and in still another embodiment with no more than about 11 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein heteroatoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein heteroatoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, wherein the substituents on the substituted alkyl, arylalkyl, and alkylaryl groups can be (but are not limited to) hydroxy groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, carboxylic acid groups, urethane groups, urea groups, mixtures thereof, and the like, wherein two or more substituents can be joined together to form a ring.

Some specific examples of suitable ethylenically unsaturated acids include 10-undecenoic acid, of the formula

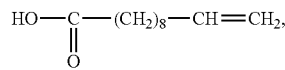

21-docosenoic acid, 6-heptenoic acid, 2,2-dimethyl-4-pentenoic acid, 2,2-dimethyl-but-3-enoic acid, acrylic acid, methacrylic acid, 3-butenoic acid, 3,7-dimethyl-6-octenoic acid, crotonic acid, 9-decenoic acid, 3-hexenoic acid, 2-methyl-3-butenoic acid, 7-oxo-11-dodecenoic acid, 7-oxo-16-heptadecenoic acid, 6-oxo-15-hexadecenoic acid, 7-oxo-8-nonenoic acid, 4-pentenoic acid, and the like, as well as mixtures thereof.

If desired, a mixture of acids including an ethylenically unsaturated acid and an acid containing no ethylenic unsaturations can be used in the reaction with the isocyanate. By so doing, the characteristics of the product can be further tailored as desired. For example, the ethylenically unsaturated acid can impart to the product curability, when in the presence of one or more suitable photoinitiators, upon exposure to ultraviolet radiation, while the acid containing no ethylenic unsaturations can impart to the product desirable solubility characteristics.

Examples of suitable alcohols include any ethylenically unsaturated alcohol, including (but not limited to) those of the formula $R_3$—OH wherein $R_3$ is (i) an alkyl group having at least one ethylenic unsaturation therein (including linear and branched, cyclic and acyclic, and substituted and unsubstituted alkyl groups, and wherein heteroatoms, such as oxygen, nitrogen, sulfur, silicon, phosphorus, and the like either may or may not be present in the alkyl group), in one embodiment with at least about 5 carbon atoms, in another embodiment with at least about 8 carbon atoms, and in yet another embodiment with at least about 12 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein heteroatoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein heteroatoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, wherein the substituents on the substituted alkyl, arylalkyl, and alkylaryl groups can be (but are not limited to) hydroxy groups, amine groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, carboxylic acid groups, urethane groups, urea groups, mixtures thereof, and the like, wherein two or more substituents can be joined together to form a ring.

Some specific examples of suitable ethylenically unsaturated alcohols include 1,4-butanediol vinyl ether, of the formula

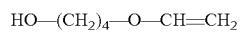

available from Sigma-Aldrich, Milwaukee, Wis., 2-allyloxyethanol, of the formula

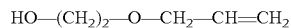

1,4-cyclohexanedimethanol vinyl ether (cis and trans isomers), of the formula

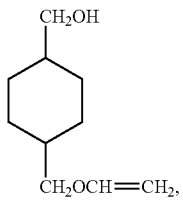

ethylene glycol vinyl ether, of the formula

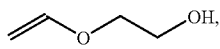

di(ethylene glycol) vinyl ether, of the formula

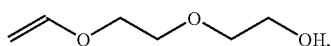

TONE M-100, commercially available from Dow Chemical Company, Midland, Mich., believed to be of the formula

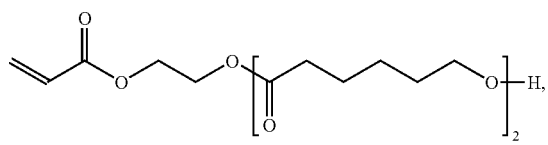

compounds of the formula

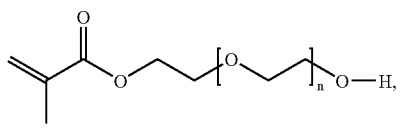

such as CD572, wherein n=10, commercially available from Sartomer Company, Exton, Pa., and the like, as well as mixtures thereof.

If desired, a mixture of alcohols including an ethylenically unsaturated alcohol and an alcohol containing no ethylenic unsaturations can be used in the reaction with the isocyanate. By so doing, the characteristics of the product can be further tailored as desired. For example, the ethylenically unsaturated alcohol can impart to the product curability, when in the presence of one or more suitable photoinitiators, upon exposure to ultraviolet radiation, while the alcohol containing no ethylenic unsaturations can impart to the product desirable solubility characteristics.

Examples of suitable amines include any ethylenically unsaturated primary or secondary amine, including (but not limited to) those of the formula $R_4$—$NHR_5$ wherein $R_4$ is (i) an alkyl group having at least one ethylenic unsaturation therein (including linear and branched, cyclic and acyclic, and substituted and unsubstituted alkyl groups, and wherein heteroatoms, such as oxygen, nitrogen, sulfur, silicon, phosphorus, and the like either may or may not be present in the alkyl group), in one embodiment with at least about 5 carbon atoms, in another embodiment with at least about 8 carbon atoms, and in yet another embodiment with at least about 12 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein heteroatoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein heteroatoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, and wherein $R_5$ can be (i) a hydrogen atom, (ii) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, and the like either may or may not be present in the alkyl group), in one embodiment with at least 1 carbon atom, and in one embodiment with no more than about 50 carbon atoms, in another embodiment with no more than about 30 carbon atoms, and in yet another embodiment with no more than about 15 carbon atoms, although the number of carbon atoms can be outside of these ranges, (iii) an aryl group (including substituted and unsubstituted aryl groups, and wherein heteroatoms, such as oxygen, nitrogen, sulfur, silicon, phosphorus, and the like either may or may not be present in the aryl group), in one embodiment with at least about 5 carbon atoms, and in another embodiment with at least about 6 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, (iv) an arylalkyl group (including substituted and unsubstituted arylalkyl groups, wherein the alkyl portion of the arylalkyl group can be linear or branched, saturated or unsaturated, cyclic or acyclic, and substituted or unsubstituted, and wherein heteroatoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, or (v) an alkylaryl group (including substituted and unsubstituted alkylaryl groups, wherein the alkyl portion of the alkylaryl group can be linear or branched, saturated or unsaturated, cyclic or acyclic, and substituted or unsubstituted, and wherein heteroatoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 30 carbon atoms, and in yet another embodiment with no more than about 15 carbon atoms, although the number of carbon atoms can be outside of these ranges, wherein the substituents on the substituted alkyl, aryl, arylalkyl, and alkylaryl groups can be (but are not limited to) hydroxy groups, amine groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, thiocyanato groups, isothiocyanato groups, carboxylate groups, urethane groups, urea groups, mixtures thereof, and the like, wherein two or more substituents can be joined together to form a ring.

Examples of suitable amines include 2(1-cyclohexenyl) ethylamine, commercially available from Sigma-Aldrich Chemical Co., Milwaukee, Wis., of the formula

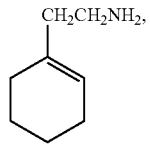

N-ethyl-2-methylallylamine, commercially available from Sigma-Aldrich Chemical Co., Milwaukee, Wis., of the formula

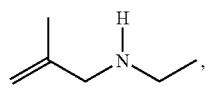

monoethanolamine vinyl ether, commercially available from Alash Ltd., Temirtau, Kazakhstan, of the formula

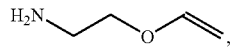

and the like.

If desired, a mixture of amines including an ethylenically unsaturated amine and an amine containing no ethylenic unsaturations can be used in the reaction with the isocyanate. By so doing, the characteristics of the product can be further tailored as desired. For example, the ethylenically unsaturated amine can impart to the product curability, when in the presence of one or more suitable photoinitiators, upon exposure to ultraviolet radiation, while the amine containing no ethylenic unsaturations can impart to the product desirable solubility characteristics.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of these compounds include ethanolamine, diethanolamine, and the like.

Any suitable reaction conditions for making urethane, urea, or urethane/urea compounds by condensing alcohols and/or amines with isocyanates can be used to prepare the urethane, urea, urea-urethane, or amide-urethane compounds. Typically (although not necessarily), the reaction is carried out at elevated temperatures (for example, from about 45 to about 160° C.) in the presence of an optional reaction catalyst, such as dibutyltin dilaurate, bismuth tris-neodecanoate, cobalt benzoate, lithium acetate, stannous octoate, triethylamine, or the like. In a specific embodiment, the reaction conditions are conducted in an inert atmosphere, such as argon or nitrogen gas or other suitable gases, to prevent oxidizing or yellowing of the reaction products and to prevent undesirable side reactions. The reaction can employ an inert solvent, such as toluene or the like, or can be performed neat (i.e., without a solvent). The mole ratio of reactants is adjusted so that the isocyanate functionalities are completely consumed in the reaction with a slight molar excess of alcohol and/or amine typically remaining. The reactants can be added together in any order and/or added to the reaction as physical mixtures. If desired, reaction conditions and the order of the addition of reactants can be controlled for several reasons, such as to provide a controlled exothermic reaction, to tailor the distribution of molecules when reacting a diisocyanate with a mixture of an alcohol and an amine, or the like. When doing these adjustments, the different reactivities to isocyanates of alcohols versus amines can be employed, as well as the different reactivities of the two separate isocyanate groups on diisocyanates such as isophorone diisocyanate. See, for example, J. H. Saunders and K. C. Frisch's "Polyurethanes Part I, Chemistry" published by Interscience of New York, N.Y. in 1962 and Olin Chemicals' LUXATE® IM isophorone diisocyanate technical product information sheet, the disclosures of each of which are totally incorporated herein by reference, which provide further explanation of this chemistry. By so tailoring the distribution of molecules, one can control the finished product to have a controlled viscosity that is designed for a specific application, have a controlled glass transition temperature and/or melting point, have consistent properties from batch to batch, or the like.

The reaction can be carried out either neat or, optionally, in the presence of a solvent. When present, any desired or effective solvent can be used. Examples of suitable solvents include xylene, toluene, benzene, chlorobenzene, nitrobenzene, dichlorobenzene, N-methylpyrrolidinone, dimethyl formamide, dimethyl sulfoxide, sulfolane, hexane, tetrahydrofuran, and the like, as well as mixtures thereof.

Reactions wherein isocyanates are reacted with alcohols, amines, and acids to form urethanes, ureas, and amides are also disclosed in, for example, U.S. application Ser. No. 10/260,146 (U.S. Publication 20040077887), U.S. Pat. No. 6,821,327, U.S. application Ser. Nos. 10/260,379 (U.S. Publication 20040082801), 10/369,981 (U.S. Publication 20040167249), 10/918,053, and 10/918,619, the disclosures of each of which are totally incorporated herein by reference.

The organic phase change carrier can include (C) a phase change inducing component. This component is referred to as a phase change inducing component because it influences the phase change transition temperature. The phase change inducing component is miscible with the other ink components and is a solid at the drum temperature at the time when the ink is jetted onto the drum in embodiments when the ink is used in printing processes wherein the substrate is an intermediate transfer member, and is a solid at the temperature of the final recording sheet in embodiments when the substrate is a final recording sheet. The phase change inducing component is a molecule with at least one hydroxyl group and has a minimum melting point of about 40° C. Examples of suitable phase change inducing components include (but are not limited to) alcohols of the formula $R_c$—OH wherein $R_c$ is (i) an alkyl group (including linear and branched, cyclic and acyclic, and substituted and unsubstituted alkyl groups, and wherein heteroatoms, such as oxygen, nitrogen, sulfur, silicon, phosphorus, and the like either may or may not be present in the alkyl group), in one embodiment with at least about 1 carbon atom, in another embodiment with at least about 5 carbon atoms, in yet another embodiment with at least about 10 carbon atoms, and in still another embodiment with at least about 15 carbon atoms, and in one embodiment with no more than about 100 carbon atoms, in another embodiment with no more than about 80 carbon atoms, and in yet another embodiment with no more than about 60 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, and the like either may or may not be present in the aryl group), in one embodiment with at least about 5 carbon atoms, in another embodiment with at least about 6 carbon atoms, and in yet another embodiment with at least about 10 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, (iii) an arylalkyl group (including substituted and unsubstituted arylalkyl groups, wherein the alkyl portion of the arylalkyl group can be linear or branched, cyclic or acyclic, and substituted or unsubstituted, and wherein heteroatoms, such as oxygen, nitrogen, sulfur, silicon, phosphorus, and the like either may or may not be present in either the aryl or the alkyl portion of the arylalkyl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, or (iv) an alkylaryl group (including substituted and unsubstituted alkylaryl groups, wherein the alkyl portion of the alkylaryl group can be linear or branched, cyclic or acyclic, and substituted or unsubstituted, and wherein heteroatoms, such as oxygen, nitrogen, sulfur, silicon, phosphorus, and the like either may or may not be present in either the aryl or the alkyl portion of the alkylaryl group), in one embodiment with at least about 6 carbon atoms, and in another embodiment with at least about 7 carbon atoms, and in one embodiment with no more than about 50 carbon atoms, in another embodiment with no more than about 25 carbon atoms, and in yet another embodiment with no more than about 12 carbon atoms, although the number of carbon atoms can be outside of these ranges, wherein the substituents on the substituted alkyl, arylalkyl, and alkylaryl groups can be (but are not limited to) hydroxy groups, halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, mixtures thereof, and the like, wherein two or more substituents can be joined together to form a ring.

Specific examples of suitable phase change inducing alcohols include 1,10-decanediol, commercially available from Sigma-Aldrich, Milwaukee, Wis., 1,12-dodecanediol, commercially available from Sigma-Aldrich, 1,2-dodecanediol, commercially available from Sigma-Aldrich, UNILIN® 350, 425, 550, and 700, which are mixtures of linear primary alcohols with average molecular weights of about 350, 425, 550, and 700, respectively, commercially available from Baker Petrolite, Sand Springs, Okla., polycaprolaetone diols, of the general formula

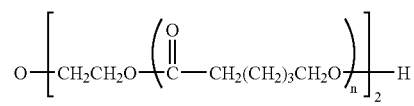

including those having $M_n$ values of about 530, 1,250, and 2,000, commercially available from Sigma-Aldrich, polycaprolactone diols, of the general formula

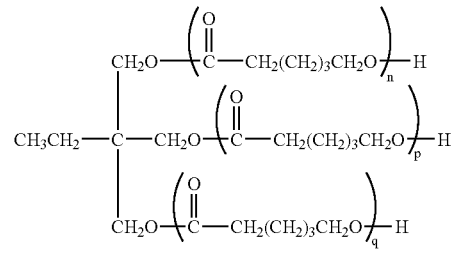

including those having $M_n$ values of about 300 and 900, commercially available from Sigma-Aldrich, heptadecanol (all isomers), octadecanol (all isomers), nonadecanol (all isomers), eicosanol ($C_{20}H_{41}OH$; all isomers), heneicosanol ($C_{21}H_{43}OH$; all isomers), docosanol ($C_{22}H_{45}OH$; all isomers), dimer diols believed to be of the formula HO—$C_{36}H_{64+n}$—OH wherein $C_{36}H_{64+n}$ is a branched alkylene group which may include unsaturations and cyclic groups, wherein n is an integer of 0, 1, 2, 3, 4, 5, 6, 7, 8, 9, or 10, including but not limited to isomers of the formulae

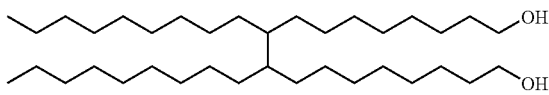

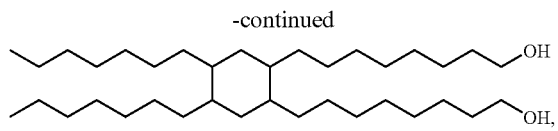

commercially available from Uniqema Chemicals, New Castle, Del., Guerbet alcohols, which are 2,2-dialkyl-1-ethanols, including (but not limited to) those of the general formula

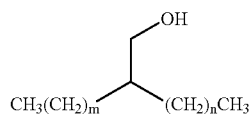

wherein m+n is greater than or equal to 10, in one embodiment being from about 16 to about 36, commercially available from Tomah Chemicals and Jarchem Industries Inc., Newark, N.J., and the like, as well as mixtures thereof.

One specific example of a phase change inducing component is hydrogenated castor oil, a triol triester believed to be of the formula

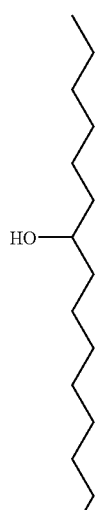

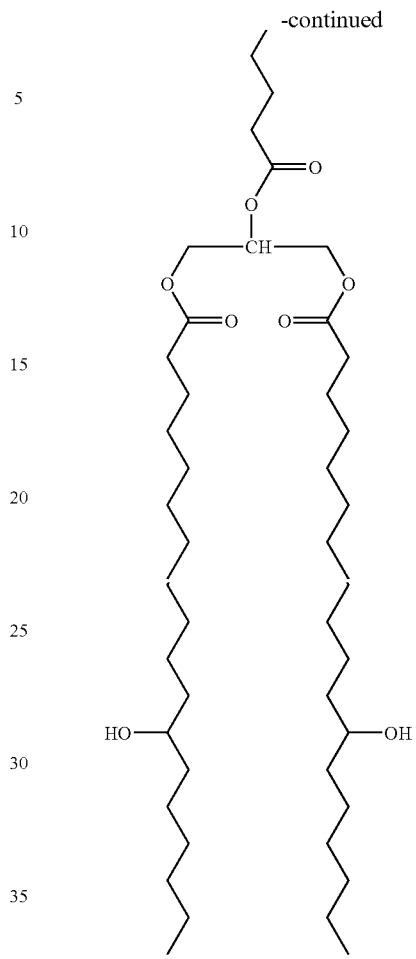

The phase change inducing component is present in the phase change ink carrier in any desired or effective amount effective to influence the phase change transition temperature, in one embodiment at least about 5 percent by weight of the carrier, in another embodiment at least about 7.5 percent by weight of the carrier, in yet another embodiment at least about 10 percent by weight of the carrier, and in still another embodiment at least about 20 percent by weight of the carrier, and in one embodiment no more than about 98 percent by weight of the carrier, in another embodiment no more than about 80 percent by weight of the carrier, in yet another embodiment no more than about 60 percent by weight of the carrier, in still another embodiment no more than about 50 percent by weight of the carrier, and in another embodiment no more than about 30 percent by weight of the carrier, although the amount can be outside of these ranges.

The organic phase change carrier may also include (D) an initator. The ink compositions further contain an initiator.

Examples of free radical initiators include benzyl ketones, monomeric hydroxyl ketones, polymeric hydroxyl ketones, α-amino ketones, acyl phosphine oxides, metallocenes, benzophenone, benzophenone derivatives, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6- trimethylbenzoyl) phosphine oxide, benzyl-dimethylketal, isopropylthioxanthone, and the like, as well as mixtures thereof.

Examples of cationic initiators include aryldiazonium salts, diaryliodonium salts, triaylsulfonium salts, triarylselenonium salts, dialkylphenacylsulfonium salts, triarylsulfoxonium salts, aryloxydiarylsulfonium salts, and the like. Specific examples include triphenylsulfonium hexaflurophosphate, methyldiphenylsulfonium hexafluorophosphate, dimethylphenylsulfonium hexaflurophosphate, diphenylnapththylsulfonium hexaflurophosphate, di(methoxynapththyl)methylsulfonium hexaflurophosphate, (4-octyloxyphenyl) phenyl iodonium hexafluoroantimonate, (4-octyloxyphenyl) diphenyl sulfonium hexafluoroantimonate, (4-decyloxyphenyl) phenyl iodonium hexafluoroantimonite, (4-dodecyloxyphenyl) diphenyl sulfonium hexafluoroantimonate, and the like, as well as mixtures thereof.

The initiator is present in the phase change ink carrier in any desired or effective amount, in one embodiment at least about 0.1 percent by weight of the carrier, in another embodiment at least about 1 percent by weight of the carrier, in yet another embodiment at least about 5 percent by weight of the carrier, and in still another embodiment at least about 10 percent by weight of the carrier, and in one embodiment no more than about 20 percent by weight of the carrier, in another embodiment no more than about 17 percent by weight of the carrier, and in yet another embodiment no more than about 15 percent by weight of the carrier, although the amount can be outside of these ranges.

In one embodiment, the phase change inducing component can comprise at least one of a gellant and an alcohol compound. In another embodiment, the gellant is compounds of the formula

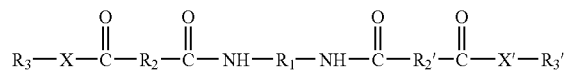

wherein:

$R_1$ is:
(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 12 carbon atoms, in another embodiment with no more than about 4 carbon atoms, and in yet another embodiment with no more than about 2 carbon atoms, although the number of carbon atoms can be outside of these ranges, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 6 carbon atoms, although the number of carbon atoms can be outside of these ranges, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_2'$ each, independently of the other, are:
(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with at least 1 carbon atom, and in one embodiment with no more than about 54 carbon atoms, and in another embodiment with no more than about 36 carbon atoms, although the number of carbon atoms can be outside of these ranges, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with at least about 6 carbon atoms, and in one embodiment with no more than about 14 carbon atoms, in another embodiment with no more than about 10 carbon atoms, and in yet another embodiment with no more than about 7 carbon atoms, although the number of carbon atoms can be outside of these ranges, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 8 carbon atoms, although the number of carbon atoms can be outside of these ranges, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with at least about 7 carbon atoms, and in one embodiment with no more than about 32 carbon atoms, in another embodiment with no more than about 22 carbon atoms, and in yet another embodiment with no more than about 7 carbon atoms, although the number of carbon atoms can be outside of these ranges, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_3'$ each, independently of the other, are either:

(a) photoinitiating groups, such as groups derived from 1-(4-(2-hydroxyethoxy)phenyl)-2-hydroxy-2-methylpropan-1-one, of the formula

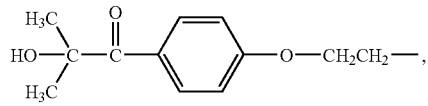

groups derived from 1-hydroxycyclohexylphenylketone, of the formula

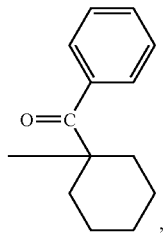

groups derived from 2-hydroxy-2-methyl-1-phenylpropan-1-one, of the formula

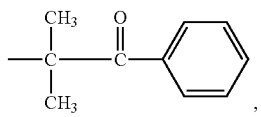

groups derived from N,N-dimethylethanolamine or N,N-dimethylethylenediamine, of the formula

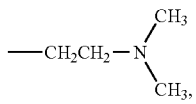

or the like, or:

(b) a group which is:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), in one embodiment with at least about 2 carbon atoms, in another embodiment with at least about 3 carbon atoms, and in yet another embodiment with at least about 4 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (ii) an aryl group (including substituted and unsubstituted aryl groups, and wherein heteroatoms, such as oxygen, nitrogen, sulfur, silicon, phosphorus, boron, and the like either may or may not be present in the aryl group), in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as benzyl or the like, or (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

and X and X' each, independently of the other, is an oxygen atom or a group of the formula —NR$_4$—, wherein R$_4$ is:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, in one embodiment with at least 1 carbon atom, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iii) an aryl group, including substituted and unsubstituted aryl groups, and wherein heteroatoms either may or may not be present in the aryl group, in one embodiment with at least about 5 carbon atoms, and in another embodiment with at least about 6 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in one embodiment with at least about 6 carbon atoms, and in another embodiment with at least about 7 carbon atoms, and in one embodiment with no more than about 100 carbon atoms, in another embodiment with no more than about 60 carbon atoms, and in yet another embodiment with no more than about 30 carbon atoms, although the number of carbon atoms can be outside of these ranges, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In one specific embodiment, R$_2$ and R$_2$' are the same as each other; in another specific embodiment, R$_2$ and R$_2$' are different from each other. In one specific embodiment, R$_3$ and R$_3$' are the same as each other; in another specific embodiment, R$_3$ and R$_3$' are different from each other.

In one specific embodiment, R$_2$ and R$_2$' are each groups of the formula —C$_{34}$H$_{56+a}$— and are branched alkylene groups which may include unsaturations and cyclic groups, wherein a is an integer of 0, 1, 2, 3, 4, 5, 6, 7, 8, 9, 10, 11, or 12, including (but not limited to) isomers of the formula

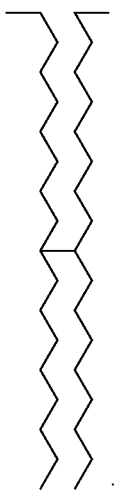
In one specific embodiment, $R_1$ is an ethylene (—CH$_2$CH$_2$—) group.
In one specific embodiment, $R_3$ and $R_3'$ are both
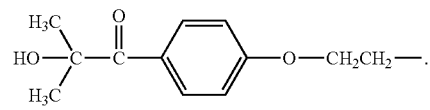
In one specific embodiment, the compound is of the formula
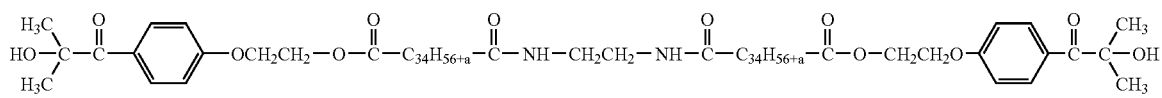
wherein —C$_{34}$H$_{56+a}$— represents a branched alkylene group which may include unsaturations and cyclic groups, wherein a is an integer of 0, 1, 2, 3, 4, 5, 6, 7, 8, 9, 10, 11, or 12, including (but not limited to) isomers of the formula
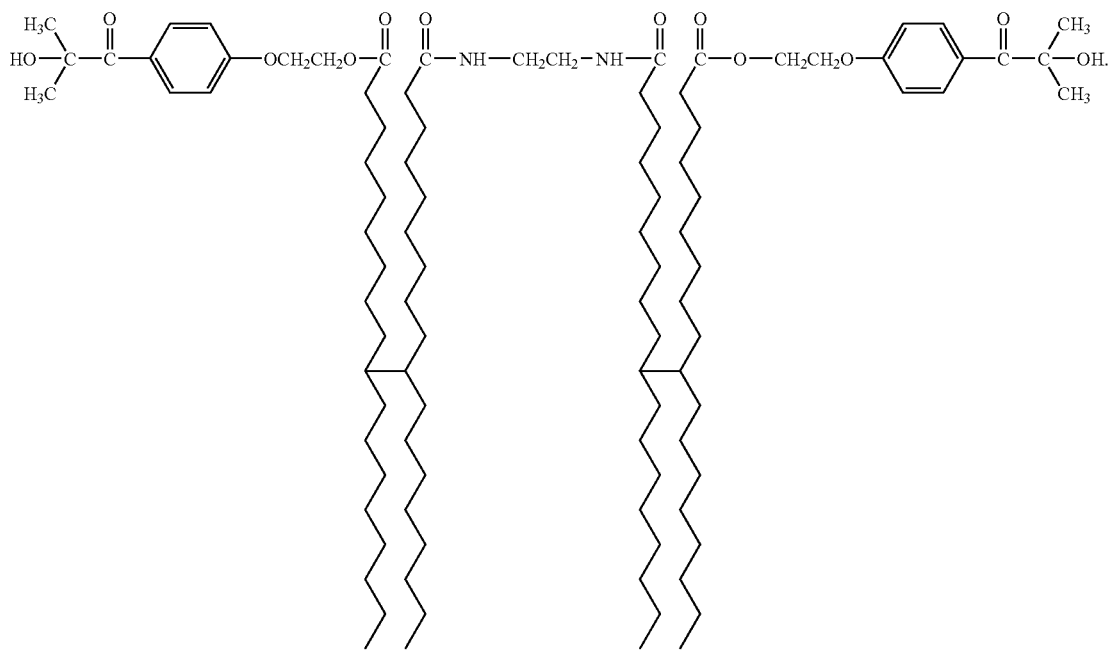

Additional specific examples of compounds of this formula include those of the formula

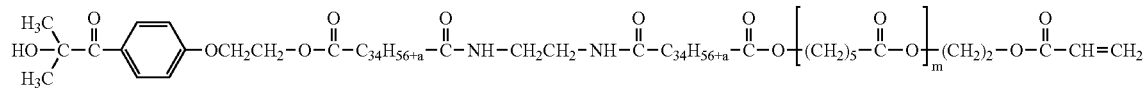

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein m is an integer, including but not limited to embodiments wherein m is 2, including (but not limited to) isomers of the formula

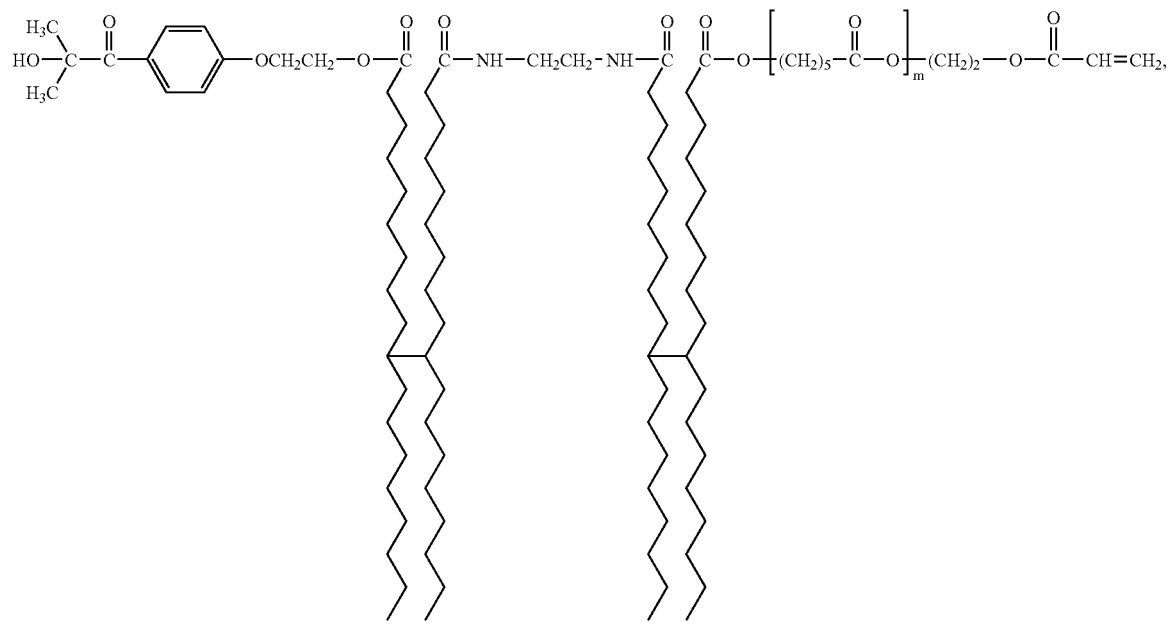

those of the formula

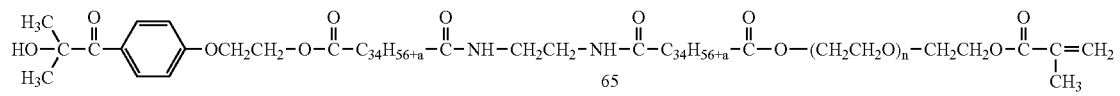

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein n is an integer, including but not limited to embodiments wherein n is 2 and wherein n is 5, including (but not limited to) isomers of the formula

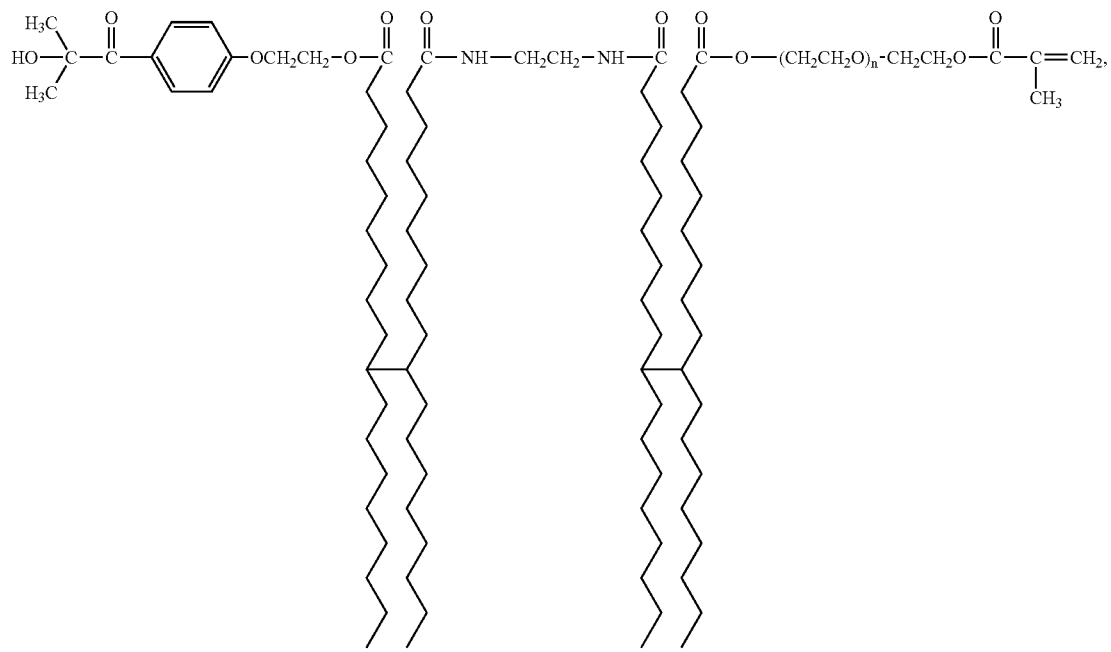

those of the formula

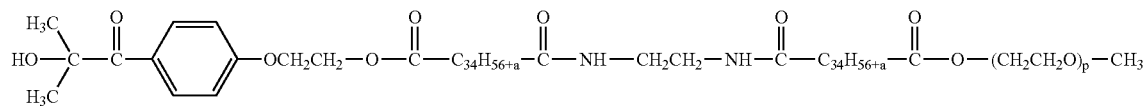

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein p is an integer, including but not limited to embodiments wherein p is 2 and wherein p is 3, including (but not limited to) isomers of the formula

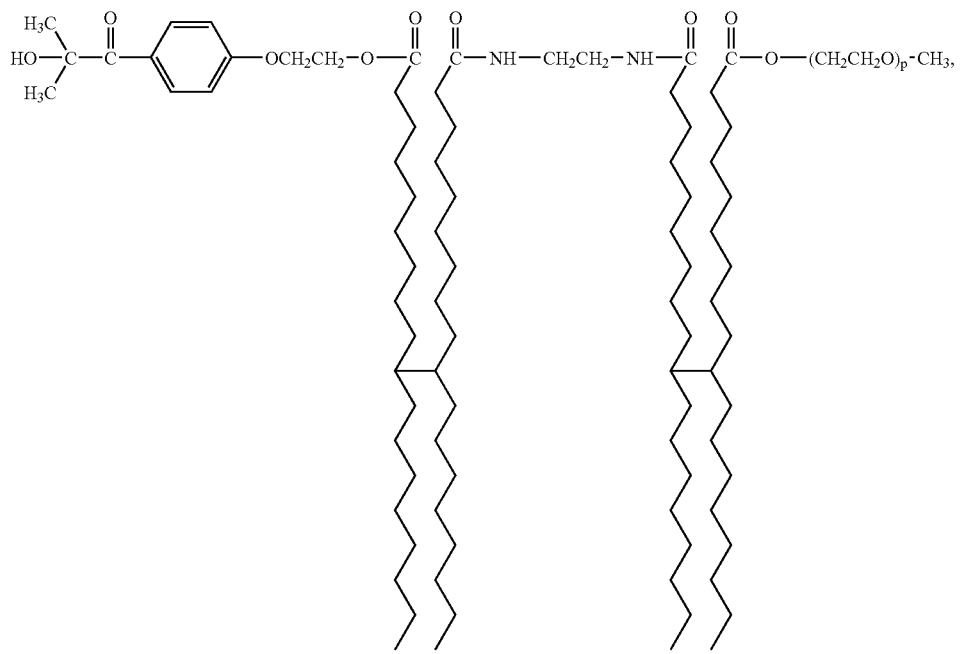
those of the formula
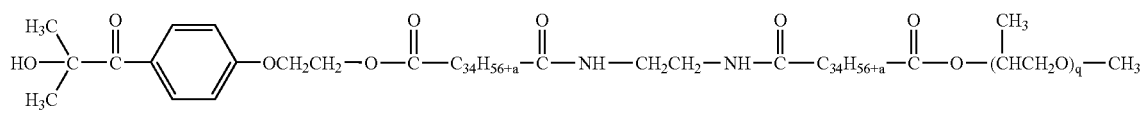
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein q is an integer, including but not limited to embodiments wherein q is 2 and wherein q is 3, including (but not limited to) isomers of the formula

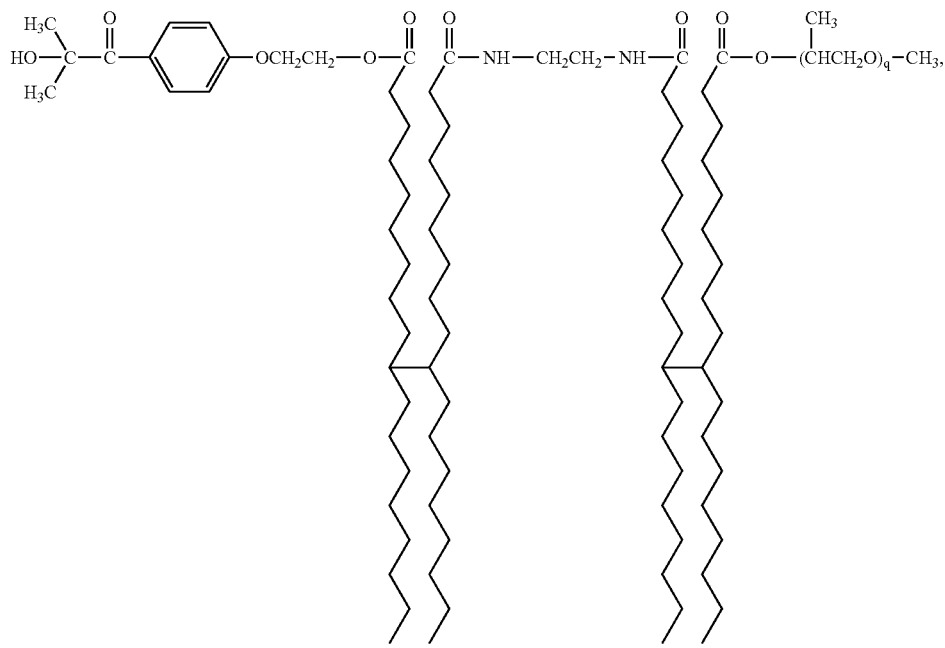
those of the formula
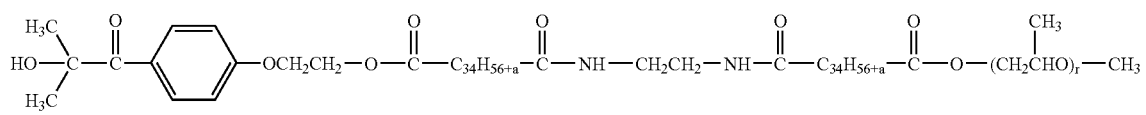
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12 and wherein r is an integer, including but not limited to embodiments wherein r is 2 and wherein r is 3, including (but not limited to) isomers of the formula

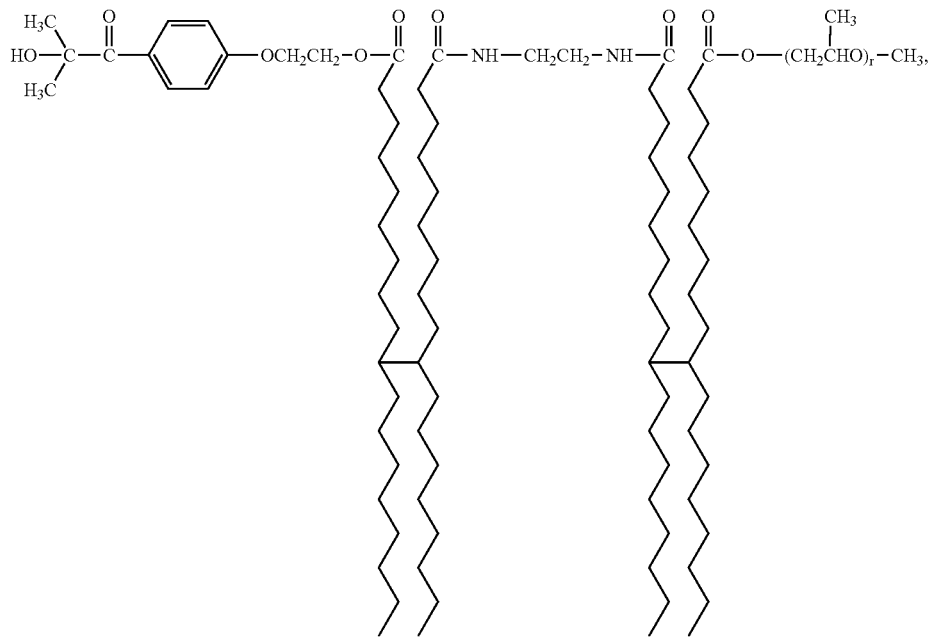

and the like, as well as mixtures thereof.

Compounds as disclosed herein can be prepared by any desired or effective method. For example, in one specific embodiment, about two molar equivalents of a diacid of the formula

HOOC—R$_2$—COOH about one molar equivalent of a diamine of the formula

H$_2$N—R$_1$—NH$_2$ and about two molar equivalents of a monoalcohol of the formula

R$_3$—OH can be reacted by use of the coupling agent such as 1,3-dicyclohexylcarbodiimide (DCC) in the presence of a catalyst such as 4-dimethylaminopyridine (DMAP), in the presence of an optional solvent such as methylene chloride (CH$_2$Cl$_2$). The ingredients can be mixed together and a one-pot reaction can be employed. More specifically, the diacid, the diamine, and the dicyclohexylcarbodiimide can be mixed together in a first step, and the monoalcohol can be added to the reaction mixture in a second step. The reaction proceeds as follows:

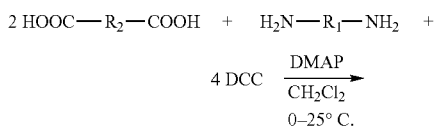

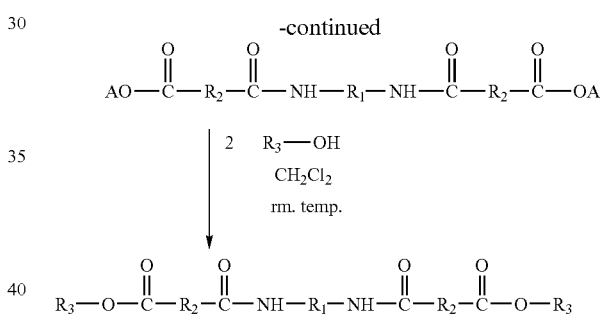

wherein A is the coupling agent.

The diacid and the diamine are present in any desired or effective relative amounts, in one embodiment at least about 0.4 mole of diamine per every 1 mole of diacid, in another embodiment at least about 0.45 mole of diamine per every 1 mole of diacid, and in yet another embodiment at least about 0.5 mole of diamine per every one mole of diacid, and in one embodiment no more than about 0.57 mole of diamine per every 1 mole of diacid, in another embodiment no more than about 0.53 mole of diamine per every 1 mole of diacid, and in yet another embodiment no more than about 0.51 mole of diamine per every 1 mole of diacid, although the relative amounts can be outside of these ranges.

The diacid and the monoalcohol are present in any desired or effective relative amounts, in one embodiment at least about 0.75 mole of monoalcohol per every 1 mole of diacid, in another embodiment at least about 0.9 mole of monoalcohol per every 1 mole of diacid, and in yet another embodiment at least about 1 mole of monoalcohol per every one mole of diacid, and in one embodiment no more than about 1.5 moles of monoalcohol per every 1 mole of diacid, in another embodiment no more than about 1.4 moles of monoalcohol per every 1 mole of diacid, and in yet another embodiment no more than about 1.25 moles of monoalcohol per every 1 mole of diacid, although the relative amounts can be outside of these ranges.

The diamine and the monoalcohol are present in any desired or effective relative amounts, in one embodiment at least about 1.5 moles of monoalcohol per every 1 mole of diamine, in another embodiment at least about 1.75 moles of monoalcohol per every 1 mole of diamine, and in yet another embodiment at least about 2 moles of monoalcohol per every one mole of diamine, and in one embodiment no more than about 2.5 moles of monoalcohol per every 1 mole of diamine, in another embodiment no more than about 2.4 moles of monoalcohol per every 1 mole of diamine, and in yet another embodiment no more than about 2.25 moles of monoalcohol per every 1 mole of diamine, although the relative amounts can be outside of these ranges.

Examples of suitable coupling agents include 1,3-dicyclohexylcarbodiimide (DCC), of the formula

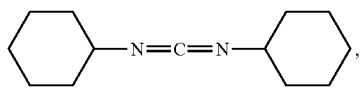

1-[3-(dimethylamino)propyl]3-ethylcarbodiimide HCl (EDCl), N,N-carbonyldiimidazole, N-cyclohexyl-N'-(2-morpholinoethyl)-carbodiimide methyl-p-toluenesulfonate, (benzotriazol-1-yloxy)tris(dimethylamino)phosphonium hexafluorophosphate (BOP), (o-benzotriazol-1-yl)-N,N,N',N'-bis(tetramethylene)uronium hexafluorophosphate (HBTU), bis(2-oxo-3-oxazolidinyl)phosphonic chloride (BOP-Cl), (1H-1,2,3-benzotriazol-1-yloxy)tris(pyrrolidino)phosphonium hexafluorophosphate (PyBOP), and the like, as well as mixtures thereof.

The coupling agent and the diacid are present in any desired or effective relative amounts, in one embodiment at least about 0.4 mole of diacid per every 1 mole of coupling agent, in another embodiment at least about 0.45 mole of diacid per every 1 mole of coupling agent, and in yet another embodiment at least about 0.5 mole of diacid per every one mole of coupling agent, and in one embodiment no more than about 0.57 mole of diacid per every 1 mole of coupling agent, in another embodiment no more than about 0.53 mole of diacid per every 1 mole of coupling agent, and in yet another embodiment no more than about 0.51 mole of diacid per every 1 mole of coupling agent, although the relative amounts can be outside of these ranges.

Examples of suitable catalysts include 4-dimethylaminopyridine (DMAP), of the formula

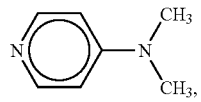

triethylamine, 1,8-diazabicyclo[5.4.0]undec-7-ene (DBU), and the like, as well as mixtures thereof.

The catalyst and the diacid are present in any desired or effective relative amounts, in one embodiment at least about 0.05 mole of catalyst per every 1 mole of diacid, in another embodiment at least about 0.1 mole of catalyst per every 1 mole of diacid, and in yet another embodiment at least about 0.2 mole of catalyst per every one mole of diacid, and in one embodiment no more than about 1 mole of catalyst per every 1 mole of diacid, in another embodiment no more than about 0.8 mole of catalyst per every 1 mole of diacid, and in yet another embodiment no more than about 0.5 mole of catalyst per every 1 mole of diacid, although the relative amounts can be outside of these ranges.

When the optional solvent is employed, any desired or effective solvent can be employed. Examples of suitable solvents include methylene chloride, tetrahydrofuran, methyl ethyl ketone, toluene, dimethyl formamide, diethyl ether, hexane, ethyl acetate, and the like, as well as mixtures thereof.

When the optional solvent is employed, the solvent can be present in any desired or effective amount, in one embodiment at least about 30 grams of diacid per liter of solvent, in another embodiment at least about 40 grams of diacid per liter of solvent, and in yet another embodiment at least about 50 grams of diacid per liter of solvent, and in one embodiment no more than about 150 grams of diacid per liter of solvent, in another embodiment no more than about 125 grams of diacid per liter of solvent, and in yet another embodiment no more than about 100 grams of diacid per liter of solvent, although the amount of solvent can be outside of these ranges.

The reaction between the diacid and the diamine in the first step of the reaction can be carried out at any desired or effective temperature, in one embodiment at least about −5° C., in another embodiment at least about −2.5° C., and in yet another embodiment at least about 0° C., and one embodiment no more than about 5° C., in another embodiment no more than about 3° C., and in yet another embodiment no more than about 2° C., although the temperature can be outside of these ranges. Thereafter, the reaction product of the diacid and diamine can be reacted with the monoalcohol at any desired or effective temperature, in one embodiment at least about 15° C., in another embodiment at least about 20° C., and in yet another embodiment at least about 25° C., and one embodiment no more than about 35° C., in another embodiment no more than about 30° C., and in yet another embodiment no more than about 27° C., although the temperature can be outside of these ranges.

The reaction between the diacid, the diamine, and the monoalcohol can be carried out for any desired or effective period of time, in one embodiment at least about 3.5 hours, in another embodiment at least about 4 hours, and in yet another embodiment at least about 4.5 hours, and in one embodiment no more than about 6.5 hours, in another embodiment no more than about 6 hours, and in another embodiment no more than about 5 hours, although the period of time can be outside of these ranges.

Subsequent to completion of the reaction, the product can be isolated by filtration of any solid by-products, or by washing the solution with water depending on the activating agent used. The solvent can be removed by rotary evaporation. If needed, the product can be purified by washing with acetone and drying.

Compounds as disclosed herein can also be prepared by first reacting about two molar equivalents of a diacid of the formula

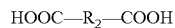

and about one molar equivalent of a diamine of the formula

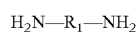

under neat conditions (i.e., in the absence of a solvent) at elevated temperatures while removing water from the reaction mixture to form an acid-terminated oligoamide of the formula

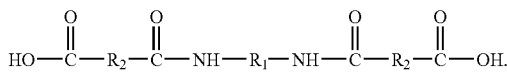

Thereafter, the acid-terminated oligoamide thus formed can be reacted with about 2 molar equivalents of a monoalcohol of the formula $R_3$—OH by use of a coupling agent such as 1,3-dicyclohexylcarbodiimide (DCC) in the presence of a catalyst such as 4-dimethylaminopyridine (DMAP) in the presence of a solvent such as methylene chloride ($CH_2Cl_2$) at reduced temperatures. The reaction proceeds as follows:

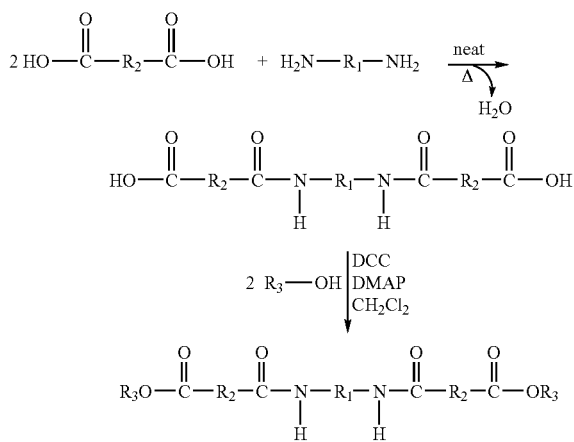

The diacid and the diamine are present in any desired or effective relative amounts, in one embodiment at least about 0.75 mole of diamine per every 2 moles of diacid, in another embodiment at least about 0.85 mole of diamine per every 2 moles of diacid, and in yet another embodiment at least about 1 mole of diamine per every 2 moles of diacid, and in one embodiment no more than about 1.5 moles of diamine per every 2 moles of diacid, in another embodiment no more than about 1.35 moles of diamine per every 2 moles of diacid, and in yet another embodiment no more than about 1.25 moles of diamine per every 2 moles of diacid, although the relative amounts can be outside of these ranges.

Water can be removed from the reaction mixture between the diacid and the diamine by any desired or effective method, such as by a Dean-Stark trap, molecular sieves or other drying agents, or the like.

The reaction between the diacid and the diamine generally is run neat, i.e., in the absence of a solvent, although a solvent can be used if desired.

The reaction between the diacid and the diamine can be carried out at any desired or effective temperature, in one embodiment at least about 130° C., in another embodiment at least about 140° C., and in yet another embodiment at least about 155° C., and one embodiment no more than about 180° C., in another embodiment no more than about 175° C., and in yet another embodiment no more than about 165° C., although the temperature can be outside of these ranges.

The reaction between the diacid and the diamine can be carried out for any desired or effective period of time, in one embodiment at least about 2 hours, in another embodiment at least about 2.5 hours, and in yet another embodiment at least about 3 hours, and in one embodiment no more than about 5 hours, in another embodiment no more than about 4.5 hours, and in another embodiment no more than about 4 hours, although the period of time can be outside of these ranges.

Thereafter, the acid-terminated oligoamide intermediate and the monoalcohol are reacted in the presence of a coupling agent, a catalyst, and a solvent.

Examples of suitable coupling agents include 1,3-dicyclohexylcarbodiimide (DCC), of the formula

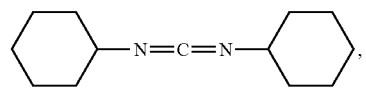

1-[3-(dimethylamino)propyl]3-ethylcarbodiimide HCl (EDCl), N,N-carbonyldiimidazole, N-cyclohexyl-N'-(2-morpholinoethyl)-carbodiimide methyl-p-toluenesulfonate, (benzotriazol-1-yloxy)tris(dimethylamino)phosphonium hexafluorophosphate (BOP), (o-benzotriazol-1-yl)-N,N,N',N'-bis(tetramethylene)uronium hexafluorophosphate (HBTU), bis(2-oxo-3-oxazolidinyl)phosphonic chloride (BOP-Cl), (1H-1,2,3-benzotriazol-1-yloxy)tris(pyrrolidino) phosphonium hexafluorophosphate (PyBOP), and the like, as well as mixtures thereof.

Examples of suitable catalysts include 4-dimethylaminopyridine (DMAP), of the formula

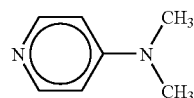

triethylamine, 1,8-diazabicyclo[5.4.0]undec-7-ene (DBU), and the like, as well as mixtures thereof.

The acid-terminated oligoamide intermediate and the monoalcohol are present in any desired or effective relative amounts, in one embodiment at least about 2 moles of monoalcohol per every 1 mole of acid-terminated oligoamide intermediate, in another embodiment at least about 2.15 moles of monoalcohol per every 1 mole of acid-terminated oligoamide intermediate, and in yet another embodiment at least about 2.25 moles of monoalcohol per every one mole of acid-terminated oligoamide intermediate, and in one embodiment no more than about 2.75 moles of monoalcohol per every 1 mole of acid-terminated oligoamide intermediate, in another embodiment no more than about 2.5 moles of monoalcohol per every 1 mole of acid-terminated oligoamide intermediate, and in yet another embodiment no more than about 2.4 moles of monoalcohol per every 1 mole of acid-terminated oligoamide intermediate, although the relative amounts can be outside of these ranges.

The acid-terminated oligoamide and the coupling agent are present in any desired or effective relative amounts, in one embodiment at least about 1.8 moles of coupling agent per every 1 mole of diacid diamide, in another embodiment at least about 2 moles of coupling agent per every 1 mole of diacid diamide, and in yet another embodiment at least about 2.2 moles of coupling agent per every one mole of diacid diamide, and in one embodiment no more than about 3 moles of coupling agent per every 1 mole of diacid diamide, in another embodiment no more than about 2.8 moles of coupling agent per every 1 mole of diacid diamide, and in yet another embodiment no more than about 2.5 moles of coupling agent per every 1 mole of diacid diamide, although the relative amounts can be outside of these ranges.

The catalyst and the acid-terminated oligoamide intermediate are present in any desired or effective relative amounts, in one embodiment at least about 0.05 mole of catalyst per every 1 mole of acid-terminated oligoamide intermediate, in another embodiment at least about 0.1 moles of catalyst per every 1 mole of acid-terminated oligoamide intermediate, and in yet another embodiment at least about 0.2 mole of catalyst per every one mole of acid-terminated oligoamide intermediate, and in one embodiment no more than about 1 mole of catalyst per every 1 mole of acid-terminated oligoamide intermediate, in another embodiment no more than about 0.8 mole of catalyst per every 1 mole of acid-terminated oligoamide intermediate, and in yet another embodiment no more than about 0.5 mole of catalyst per every 1 mole of acid-terminated oligoamide intermediate, although the relative amounts can be outside of these ranges.

Any desired or effective solvent can be employed. Examples of suitable solvents include methylene chloride, tetrahydrofuran, methyl ethyl ketone, toluene, dimethyl formamide, diethyl ether, hexane, ethyl acetate, and the like, as well as mixtures thereof.

The solvent can be present in any desired or effective amount, in one embodiment at least about 20 milliliters of solvent per gram of acid-terminated oligoamide intermediate, in another embodiment at least about 25 milliliters of solvent per gram of acid-terminated oligoamide intermediate, and in yet another embodiment at least about 30 milliliters of solvent per gram of acid-terminated oligoamide intermediate, and in one embodiment no more than about 100 milliliters of solvent per gram of acid-terminated oligoamide intermediate, in another embodiment no more than about 90 milliliters of solvent per gram of acid-terminated oligoamide intermediate, and in yet another embodiment no more than about 80 milliliters of solvent per gram of acid-terminated oligoamide intermediate, although the amount of solvent can be outside of these ranges.

The reaction between the acid-terminated oligoamide intermediate, the monoalcohol, and the coupling agent can be carried out at any desired or effective temperature, in one embodiment at least about 15° C., in another embodiment at least about 20° C., and in yet another embodiment at least about 25° C., and one embodiment no more than about 40° C., in another embodiment no more than about 35° C., and in yet another embodiment no more than about 30° C., although the temperature can be outside of these ranges.

The reaction between the acid-terminated oligoamide intermediate, the monoalcohol, and the coupling agent can be carried out for any desired or effective period of time, in one embodiment at least about 2 hours, in another embodiment at least about 2.5 hours, and in yet another embodiment at least about 3 hours, and in one embodiment no more than about 5 hours, in another embodiment no more than about 4.5 hours, and in another embodiment no more than about 4 hours, although the period of time can be outside of these ranges.

Subsequent to completion of the reaction, the product can be recovered by any desired or effective method, such as filtration of any solid by-products or washing the solution with water depending on the coupling agent used. The solvent can be removed by rotary evaporation. If needed, the product can be purified by washing with acetone and dried in a vacuum oven.

Analogous procedures can be employed using amine compounds of the formula $HNR_3R_4$ in place of monoalcohols of the formula $R_3OH$.

In a further embodiment, one of the one or more gellants in the ink vehicle is a composite material comprised of a polymerizable epoxy resin that is chemically functionalized with either ethylenically unsaturated groups or hydrocarbon groups or combinations thereof, and a polyamide resin based on a polymerized fatty acid and a polyamine, and an optional reactive diluent that optionally contains unsaturated functional groups.

The gellant composition comprised of epoxy resin and polyamide resin exhibits a thermally reversible and narrow gel phase transition when formulated into a phase change radiation curable ink composition. For example, at a temperature of 30° C. suitable for transfuse printing, the radiation curable gel ink exhibits gel state viscosities of at least $10^4$ mPa·s. Further, at temperatures of from about 30° C. to about 50° C., the ink in one embodiment has a storage modulus of at least $10^2$ Pa. Such viscoelastic rheology is useful for transfuse printing onto an intermediate transfer surface, since the gelled ink droplets are able to transfer the ink from the intermediate transfer surface to an image receiving substrate such as paper. Further, the ink does not typically experience any obvious phase-separation (separating into its liquid and solid material components) during the transfuse process by the action of the pressure roll.

The epoxy resin component in the composite gellant can be any suitable epoxy group-containing material. In specific embodiments, the epoxy resin component is selected from among the diglycidyl ethers of either polyphenol-based epoxy resin or a polyol-based epoxy resin, or mixtures thereof. These epoxy resins have two epoxy functional groups that are preferably located at the terminal ends of the molecule. The polyphenol-based epoxy resin is preferably a bisphenol A-co-epichlorohydrin resin with not more than two glycidyl ether terminal groups. The polyol-based epoxy resin in these embodiments is a dipropylene glycol-co-epichlorohydrin resin with not more than two glycidyl ether terminal groups. Epoxy resins have a weight average molecular weight in the range of in one embodiment about 200 to about 800, and in another embodiment of about 300 to about 700, although the molecular weight can be outside of these ranges. Commercially available sources of epoxy resins are, for example, the bisphenol-A based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc., Philadelphia Pa. may also be used.

Further, the epoxy resin component contains at least one ethylenically unsaturated functional group that is curable via free-radical initiation and enables chemical bonding of the gellant to the cured ink vehicle. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth) acrylic acid.

Furthermore, the epoxy resin component may additionally be functionalized by reaction with a saturated hydrocarbon monocarboxylic acid comprised of in one embodiment at least 8 carbons, and in another embodiment at least 10 carbons, such as capric acid, lauric acid, myristic acid, stearic acid and 12-hydroxystearic acid, and the like. The saturated monocarboxylic acid is in one specific embodiment a linear, non-branched hydrocarbon acid, rather than a branched hydrocarbon acid, the latter which can in some instances act to physically disrupt the gellant network structure. The weight-percent ratio of the unsaturated monocarboxylic acid to linear saturated monocarboxylic acid that is used to chemically functionalize the epoxy resin component can range from about 1:1 to about 20:1, and is in other embodiments from about 2:1 to about 5:1, but can also be outside of these ranges. The condensation reaction between the terminal epoxide functional groups on the epoxy resin and the unsaturated or saturated carboxylic acids can, if desired, be accelerated by use of a suitable catalyst, for example triphenyl phosphine, bulky tertiary bases such as DABCO, triisopropylamine, alkoxylate salts such as potassium tert-butoxide, and the like. The amount of catalyst used is in one embodiment less than about 5 wt %, and in another embodiment less than about 1 wt % of total solid components.

As the polyamide component of the epoxy-polyamide composite gellant, any suitable polyamide material may be used without limitation. Preferably, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acid," prepared from dimerized C-18 unsaturated acid feedstocks such as oleic acid, linoleic acid and the like, and a polyamine, most preferably a diamine (for example, alkylenediamines such as ethylenediamine, DYTEK® series diamines, poly(alkylencoxy)diamines, and the like, or also copolymers of polyamides such as polyester-polyamides and polyether-polyamides. One or more polyamide resins may be used in the formation of the curable gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963, all of which have low molecular weights and low amine numbers. The SYLVA-GEL® polyamide resins from Arizona Chemical Company, and variants thereof including polyether-polyamide resins may be employed. The composition of the SYLVAGEL® resins obtained from Arizona Chemical Company are disclosed in U.S. Pat. Nos. 6,492,458 and 6,399,713 and U.S. Patent Publication No. US 2003/0065084, which are totally incorporated herein by reference, and are described as polyalkyleneoxydiamine polyamides with the general formula,

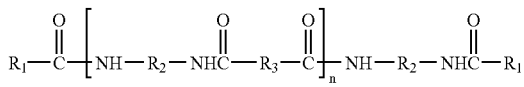

wherein $R_1$ is an alkyl group having at least seventeen carbons, $R_2$ includes a polyalkyleneoxide, $R_3$ includes a C-6 carbocyclic group, and n is an integer of at least 1.

The polyamide resin is in one embodiment of low molecular weight, with number average molecular weight of less than about 15,000 grams per mole, in another embodiment less than about 10,000 grams per mole, and in yet another embodiment less than about 7,000 grams per mole, as determined by gel permeation chromatography (GPC) referenced with a polystyrene standard. The amine number of the polyamide resin is typically low, with values in the range of in one embodiment from 0 to about 10, and in another embodiment with values in the range of from 0 to about 5.

The curable epoxy polyamide composite gellants can be prepared by any suitable method, such as by mixing the epoxy resin components with the ethylenically unsaturated group-containing component and optional saturated hydrocarbon monocarboxylic acid, in the presence of the polyamide resin and an esterification catalyst, and then heating the mixture over several hours while stirring sufficiently to blend all of the components so as to obtain a homogeneous mixture. The reaction is allowed to progress for a suitable time period, whereby conversion to the desired products is monitored spectroscopically and by the change in total acid number.

The relative weight-percent ratio of epoxy resin components and polyamide resin components in the gellant composition may range from, for example, 20:1 to 0.1:1, but can also be outside of these ranges. The impact of this ratio upon ink performance is multi-faceted. While the structures of the epoxy resin and polyamide resin components can vary, in general the epoxy resin component provides more solubility in common reactive diluents while the less soluble, more polar polyamide component provides greater gel properties. The epoxy resin component is more readily reacted with acrylic acid to provide acrylate functionality than the polyamide resin, and thus imparts higher levels of cure to the final image.

An illustration of the effect of the ratio of epoxy resin to polyamide resin with a particular selection of the respective resins upon the storage modulus G' of the ink may be seen from the fact that at a ratio of 1.3:1.0, the storage modulus of the ink is $7 \times 10^3$ Pa and the ratio of jetting viscosity to gel viscosity at 30° C. is $1.5 \times 10^5$, while at a ratio of 0.5:1.0, the storage modulus is $3.4 \times 10^2$ Pa and the ratio of jetting viscosity to gel viscosity at 30° C. is $9.4 \times 10^3$.

The results indicate that two gellants with different relative ratios of the very same epoxy resin and polyamide resin components can exert a dramatically different effect on the viscoelastic behavior of the ink composition.

While not being limited to any particular theory, the polyamide resin is believed to function as the principal gelling agent in the composite gellant, since polyamides, and amide groups in general, are known to form extensive hydrogen-bonded networks in the presence of other solvents or components that are proton sources, including alcohols, phenols, amines and carboxylic acids.

The radiation curable phase change ink compositions are comprised of the curable epoxy-polyamide composite gellant in an amount in one embodiment from about 1% to about 50% by weight of the ink, in another embodiment from about 5% to about 25% by weight of the ink, and in yet another embodiment from about 7% to about 15% by weight of the ink, although the value can also be outside of this range.

In the composition of the curable epoxy-polyamide composite gellant is also optionally included a reactive diluent. Such diluents may include one or more monomers, one or more oligomers, one or more polymers, or any mixture/combination thereof. The reactive diluent can function as a solvent to dilute the gellant composition and enable the appropriate rheological properties, such as gellant viscosity and elasticity, but does not participate in any way with the chemical functionalization of the epoxy resin component. Furthermore, the optional reactive diluent becomes a part of the liquid components integrated within the gellant network structure, such that upon curing of an ink that is comprised of the same reactive diluent, the composite gellant material will be covalently linked with the cured ink vehicle and will thereby resist phase separation during the printing process. Examples of reactive diluents that are suitable for the gellant composition include monomers such as (meth)acrylate esters such as isobornyl (meth)acrylate and lauryl (meth)acrylate, vinyl ethers or vinyl esters, allylic esters or allylic ethers, vinyl or allyl arenes such as styrene and vinyl toluene, and the like. Commercially available sources of reactive diluents that are also used within the ink vehicle composition include, for example, propoxylated neopentyl glycol diacrylate (available from Sartomer Co. Inc. as SR9003), and glycerol propoxylate triacrylate, and the like.

For example, where the organic gellant is cationically curable (e.g., wherein the curable functional groups include epoxy, vinyl ether, allyl, styrene and other vinyl benzene derivatives, or oxetane groups), additional cationically curable monomers or oligomers may be included in the ink vehicle.

Cationically curable monomers may include, for example, cycloaliphatic epoxide, and preferably one or more polyfunctional cycloaliphatic epoxides. The epoxy groups may be internal or terminal epoxy groups such as those described in WO 02/06371, incorporated herein by reference. Multifunctional vinyl ethers can also be used.

Radically curable monomers may include, for example, acrylate and methacrylate monomers. As relatively non polar monomers, mention may be made of isobornyl (meth)acrylate, lauryl (meth)acrylate, isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the crosslink density of the cured image, thereby enhancing the toughness of the cured images. As multifunctional acrylates and methacrylates, mention may be made of pentaerythritol tetra (meth)acrylate, 1,2 ethylene glycol di(meth)acrylate, 1,6 hexanediol di(meth)acrylate, 1,12-dodecanol di(meth)acrylate, tris (2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), and the like.

The reactive diluent material is preferably added to the ink in amounts of from, for example, 0 to about 80% by weight, preferably about 1 to about 80% by weight, more preferably about 35 to about 70% by weight, of the ink.

Radiation curable as used herein is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, preferably in the presence of photoinitiators and/or sensitizers, curing using e-beam radiation, preferably in the absence of photoinitiators, curing using thermal curing, in the presence or absence of high temperature thermal initiators (and which are preferably largely inactive at the jetting temperature), and appropriate combinations thereof.

The one or more organic gellants function to dramatically increase the viscosity of the radiation curable phase change ink within a desired temperature range. In particular, the gellant forms a semi-solid gel in the ink vehicle at temperatures below the specific temperature at which the ink is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The inks exhibit a thermally reversible transition between the semi-solid gel state and the liquid state when the temperature is varied above or below the gel phase transition of the ink. This reversible cycle of transitioning between semi-solid gel phase and liquid phase can be repeated many times in the ink formulation. Mixtures of one or more gellants may be used to effect the phase-change transition.

The phase change inks in embodiments may be liquid or solid at room temperature. It is desired for the phase change radiation curable inks to have a viscosity of in one embodiment less than about 50 mPa·s, in another embodiment less than about 30 mPa·s, for example from about 3 to about 30 mPa·s, in yet another embodiment from about 5 to about 20 mPa·s, and in still another embodiment from about 8 to about 13 mPa·s, at the temperature of jetting. In some embodiments, the inks are jetted at low temperatures, such as at temperatures below 110° C., for example about 40° C. to about 110° C., in other embodiments from about 50° C. to about 110° C., and in yet other embodiments from about 60° C. to about 90° C., although the jetting temperature can be outside this range.

At such low jetting temperatures, the conventional use of temperature differential between the jetted ink and the substrate upon which the ink is jetted in order to effect a rapid phase change in the ink (i.e., from liquid to solid) may not be effective. The gellant can thus be used to effect a rapid viscosity increase in the jetted ink upon the substrate. In particular, jetted ink droplets would be pinned into position on a receiving substrate such as an image receiving medium (e.g., paper) or an intermediate transfer member (e.g., a transfuse drum or belt) that is at a temperature cooler than the ink jetting temperature of the ink through the action of a phase change transition in which the ink undergoes a significant viscosity change from a liquid state to a gel state (or semi-solid state).

In embodiments, the temperature at which the ink forms the gel state is any temperature below the jetting temperature of the ink, for example any temperature that is about 5° C. or more below the jetting temperature of the ink. In embodiments, the gel state may be formed at temperatures in one embodiment from about 25° C. to about 100° C., in another embodiment from about 30° C. to about 70° C., and in yet another embodiment from about 30° C. to about 50° C., although the temperature can be outside this range. There is a rapid and large increase in ink viscosity upon cooling from the jetting temperature at which the ink is in a liquid state, to the gel transition temperature, at which the ink converts to the gel state. The viscosity increase is in one embodiment at least a $10^{2.5}$-fold increase in viscosity.

It has been found that optimum transfer efficiency from an intermediate transfer surface and optimum print quality may be achieved if the viscosity of the ink image deposited on the drum is greatly increased after jetting the ink, so as to obtain a stable and transferable image that will not smear. A suitable gellant for the ink would gel the monomers/oligomers in the ink vehicle quickly and reversibly, and demonstrate a narrow phase-change transition, for example within a temperature range in one embodiment of about 30° C. to about 100° C., and in another embodiment of about 30° C. to about 70° C., although the transition range may also be outside of these temperature ranges. The gel state of the ink also exhibits in one embodiment a minimum of $10^{2.5}$ mPa·s, in another embodiment a minimum of 1 mPa·s, increase in viscosity at preferred transferring temperatures, e.g., from about 30 to about 70° C., compared to the viscosity at the jetting temperature. Of particular preference are gellant containing inks that rapidly increase in viscosity within 5° C. to 10° C. below the jetting temperature and ultimately reach a viscosity in one embodiment above $10^4$ times the jetting viscosity, and in another embodiment about $10^5$ times the jetting viscosity. In direct to paper applications, increases in viscosity greater than $10^6$, while providing minimal show through or feathering of the image, tend to have insufficient drop spread and may preserve undesirable artifacts of jetting, such as drop structure. In intermediate transfer architectures, the ink image can be spread and smoothed by external pressure allowing much higher increases in viscosity by the gellant containing ink. Further, in embodiments that employ intermediate transfer of the image, the gel ink preferably also has good elastic properties to enable complete transfer from the drum, a property which can be inferred from the value of the storage modulus (G' max) at the transfuse temperature.

When the inks are in the gel state, the viscosity of the ink is in one embodiment at least about 1,000 mPa·s, in another embodiment at least about 10,000 mPa·s, and in yet another embodiment at least about 100,000 mPa·s. Viscosity values in the gel state are in the range of in one embodiment from about $10^3$ to about $10^9$ mPa·s, and in another embodiment from about $10^{4.5}$ to about $10^{6.5}$ mPa·s, although the gel state viscosity can be outside of these ranges. The desired gel phase viscosity can vary with the print process. For example, the highest viscosities are desired when employing intermediate transfer, or when jetting directly to porous paper in order to minimize the effects of ink bleed and feathering. On the other hand, less porous substrates such as plastic may require lower viscosities that control dot gain and agglomeration of individual ink pixels. The gel viscosity can be controlled by ink formulation and substrate temperature. An additional benefit of the gel state for radiation curable inks is that higher viscosities of about $10^3$-$10^4$ mPa·s can reduce oxygen diffusion in the ink, which in turn leads to a faster rate of cure in free radical initiation.

A plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the organic phase change carrier. The plasticizer is present in the organic phase change carrier in any desired or effective amount, in one embodiment of at least about 0.05% by weight of the organic phase change carrier, in another embodiment of at least about 1% by weight of the organic phase change carrier, and in yet another embodiment of at least about 2% by weight of the organic phase change carrier, and in one embodiment of equal to or less than about 15% by weight of the organic phase change carrier, in another embodiment of equal to or less than about 10% by weight of the organic phase change carrier, and in yet another embodiment of equal to or less than about 5% by weight of the organic phase change carrier, although the amount can be outside of these ranges. Examples of suitable plasticizers include SANTICIZER® 278, SANTICIZER® 154, SANTICIZER®160, SANTICIZER® 261 (commercially available from Monsanto), and the like or mixtures thereof.

A hindered amine antioxidant may be present in the ink in any desired or effective amount, in one embodiment of at least about 0.001 percent by weight of the organic phase change carrier, in another embodiment of at least about 0.05 percent by weight of the organic phase change carrier, and in yet another embodiment of at least about 0.10 percent by weight of the organic phase change carrier, and in one embodiment of equal to or less than about 0.50 percent by weight of the organic phase change carrier, in another embodiment of equal to or less than about 0.25 percent by weight of the organic phase change carrier, and in yet another embodiment of equal to or less than about 0.15 percent by weight of the organic phase change carrier, although the amount can be outside of these ranges.

Examples of suitable hindered amine antioxidants include those of general formula

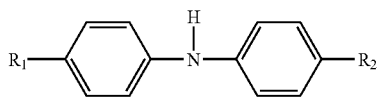

wherein $R_1$ and $R_2$ each, independently of the other, can be a hydrogen atom or an alkyl group, including linear, branched, saturated, unsaturated, cyclic, substituted, and unsubstituted alkyl groups, and wherein heteroatoms, such as oxygen, nitrogen, sulfur, silicon, phosphorus, boron, either may or may not be present in the alkyl group, in one embodiment with at least 1 carbon atom.

Specific examples of suitable hindered amine antioxidants include the following antioxidants commercially available from Crompton; NAUGUARD® 445 where $R_1$=$R_2$=C(CH$_3$)$_2$Ph, NAUGUARD® 635 where $R_1$=$R_2$=—CH(CH$_3$)Ph, NAUGUARD® PS-30 where $R_1$=$C_4$ or $C_8$, $R_2$=$C_4$ or $C_8$ and the like.

A hindered phenol antioxidant can also be provided. In one embodiment the hindered phenol is present in a relatively high concentration. A high concentration of hindered phenol antioxidant maximizes long term thermal stability by delaying the onset of the oxidation itself. The hindered phenol antioxidant is present in the ink in any desired or effective amount, in one embodiment of at least about 0.01% by weight of the organic phase change carrier, in another embodiment of at least about 0.5% by weight of the organic phase change carrier, and in yet another embodiment of at least about 1.5% by weight of the organic phase change carrier, and in one embodiment equal to or less than about 4.0% by weight of the organic phase change carrier, in another embodiment equal to or less than about 3.0% by weight of the organic phase change carrier, and in yet another embodiment equal to or less than about 2.5% by weight of the organic phase change carrier, although the amount can be outside of these ranges. Specific examples of suitable hindered phenol antioxidants include ETHANOX® 330, ETHANOX® 310, ETHANOX® 314, ETHANOX® 376 (commercially available from Albemarle) and the like. Also commercially available from Ciba Specialty Chemicals are IRGANOX® 1010, IRGANOX® 1035, IRGANOX®1076, IRGANOX® 1330 and the like. Mixtures of two or more of these hindered phenol antioxidants can also be employed.

A dispersant can be present in the ink in any desired or effective amount for purposes of dispersing and stabilizing the pigment, and the silica or alternative nanoparticles present in the ink vehicle. The dispersant is present in any desired or effective amount, in one embodiment of at least about $1\times10^{-5}$% by weight of the organic phase change carrier, in another embodiment of at least about $1\times10^{-3}$% by weight of the organic phase change carrier, and in yet another embodiment of at least about $5\times10^{-1}$% by weight of the organic phase change carrier, and in one embodiment equal to or less than about 30% by weight of the organic phase change carrier, in another embodiment equal to or less than about 20% by weight of the organic phase change carrier, and in yet another embodiment equal to or less than about 10% by weight of the organic phase change carrier, although the amount can be outside of these ranges. Specific examples of suitable dispersants are polyalkylene succinimide dispersants such as those disclosed in U.S. Pat. No. 6,858,070, the disclosure of which is totally incorporated herein by reference. Dispersants can include the Chevron Oronite OLOA 11000, OLOA 11001, OLOA 11002, OLOA 11005, OLOA 371, OLOA 375, OLOA 411, OLOA 4500, OLOA 4600, OLOA 8800, OLOA 8900, OLOA 9000, OLOA 9200 and the like, commercially available from Chevron Oronite Company LLC, Houston, Tex., as well as mixtures thereof. Examples of suitable polyalkylene succinimides and their precursors and methods of making them are disclosed in, for example, U.S. Pat. Nos. 3,172,892, 3,202,678, 3,280,034, 3,442,808, 3,361,673, 3,172,892, 3,912,764, 5,286,799, 5,319,030, 3,219,666, 3,381,022, 4,234,435, and European Patent Publication 0 776 963, the disclosures of each of which are totally incorporated herein by reference.

A rosin ester resin, mixtures thereof, or the like can also be included in the organic phase change carrier. The rosin ester resin is present in the organic phase change carrier in any desired or effective amount, in one embodiment of at least about 0.5% by weight of the organic phase change carrier, in another embodiment of at least about 2% by weight of the organic phase change carrier, and in yet another embodiment of at least about 3% by weight of the organic phase change carrier, and in one embodiment of equal to or less than about 20% by weight of the organic phase change carrier, in another embodiment equal to or less than about 15% by weight of the organic phase change carrier, and in yet another embodiment equal to or less than about 10% by weight of the organic phase change carrier, although the amount can be outside of these ranges. Examples of suitable rosin ester resins include PINECRYSTAL® KE-100 (commercially available from Arakawa), and the like.

Fatty amides, such as monoamides, diamides, triamides and tetraamides, mixture thereof, or the like can also be included in the organic phase change carrier. The amide can be present in one embodiment in an amount of at least about 1% by weight of the organic phase change carrier, in another embodiment of at least about 2% by weight of the organic phase change carrier, and in yet another embodiment of at least about 3% by weight of the organic phase change carrier, and in one embodiment equal to or less than about 30% by weight of the organic phase change carrier, in another embodiment equal to or less than about 15% by weight of the organic phase change carrier, and in yet another embodiment equal to or less than about 5% by weight of the organic phase change carrier, although the amount can be outside of these ranges. Examples of suitable amides include stearyl stearamide, a tetra amide resin obtained from the reaction of one equivalent of dimer acid with two equivalents of ethylene diamine and UNICID® 700 (commercially available from Baker Petrolite), a carboxylic acid derivative of a long chain alcohol, prepared as described in Example 1 of U.S. Pat. No. 6,174,937, column 49, line 53 to column 50, line 27, the entire disclosure of U.S. Pat. No. 6,174,937 being totally incorporated herein by reference.

The inks disclosed herein can be obtained by dispersing the colloidal silica dispersions into the ink components in such a manner as to maximize uniform dispersion and resist substantial aggregation. This can include the step of removing a substantial portion of the solvent from the solvent-silica nanoparticles, and disseminating the colloidal silica dispersion within the organic phase change carrier components. More specifically, the method for producing a low energy phase change ink composition can comprise combining together an organic phase change carrier comprising a colloidal dispersion of nanoparticles comprising nanoparticles in a solvent, at least one curable monomer, a phase change inducing component and an initiator. The organic phase change carrier exhibits a substantially uniform distribution of said nanoparticles discretely distributed therewithin, and exhibits a substantially increased resistance to aggregation of the nanoparticles distributed therewithin. The method can comprise combining the curable monomer, inducing component, and initiator with the nanoparticles in a solvent while evaporating said solvent to form a substantially homogeneous solution of said organic phase change carrier. Then, a colorant is added to the substantially homogeneous solution of the organic phase change carrier to form the low energy phase change ink composition.

The organic phase change carrier can be present in the phase change ink prepared in any desired or effective amount, in one embodiment in an amount of at least about 50% by weight of the ink, in another embodiment of at least about 70% by weight of the ink, and in yet another embodiment of at least about 90% by weight of the ink, and in one embodiment equal to or less than about 99% by weight of the ink, in another embodiment equal to or less than about 98% by weight of the ink, and in yet another embodiment equal to or less than about 95% by weight of the ink, although the amount can be outside of these ranges. In one specific embodiment, the organic phase change carrier has a melting point of less than about 110° C., and in another embodiment of less than about 100° C., although the melting point of the organic phase change carrier can be outside of these ranges.

The phase change ink compositions also contain a colorant. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include EASTMAN olefin, USHARECT Blue 86 (Direct Blue 86), available from USHANTI Color; INTRALITE Turquoise 8GL (Direct Blue 86), available from Classic Dyestuffs; CHEMICTIVE Brilliant Red 7BH (Reactive Red 4), available from Chemiequip; LEVAFIX Black EB, available from Bayer; REACTRON Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; CARTASOL Yellow 6GF, available from Clariant; CARTA Blue 2GL, available from Clariant; metal phthalocyanine colorants such as those disclosed in U.S. Pat. No. 6,221,137, the disclosure of which is totally incorporated herein by reference and the like. Particularly suitable are solvent dyes; within the class of solvent dyes, spirit soluble dyes are desired because of their compatibility with the ink vehicles of the present invention. Examples of suitable spirit solvent dyes include NEOZAPON Red 492 (BASF); ORASOL Red G (Ciba); Direct Brilliant Pink B (Global Colors); AIZEN SPILON Red C-BH (Hodogaya Chemical); KAYANOL Red 3BL (Nippon Kayaku); Spirit Fast Yellow 3G; AIZEN SPILON Yellow C-GNH (Hodogaya Chemical); CARTASOL Brilliant Yellow 4GF (Clariant); PERGASOL Yellow CGP (Ciba); ORASOL Black RLP (Ciba); SAVINYL Black RLS (Clariant); MORFAST Black Conc. A (Rohm and Haas); ORASOL Blue GN (Ciba); SAVINYL Blue GLS (Sandoz); LUXOL Fast Blue MBSN (Pylam); SEVRON Blue 5GMF (Classic Dyestuffs); BASACID Blue 750 (BASF), and the like. NEOZAPON Black X51 (C.I. Solvent Black, C.I. 12195) (BASF), Sudan Blue 670 (C.I. 61554) (BASF), Sudan Yellow 146 (C.I. 12700) (BASF), Sudan Red 462 (C.I. 260501) (BASF), Olefin dyes (Eastman Chemical Company), and Neopen Blue 808 (BASF), are particularly suitable in some embodiments. Polymeric dyes can also be used, such as those disclosed in, for example, U.S. Pat. Nos. 5,621,022 and 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include Paliogen Violet 5100 (BASF); Paliogen Violet 5890 (BASF); Heliogen Green L8730 (BASF); Lithol Scarlet D3700 (BASF); Sunfast Blue 15:4 (Sun Chemical 249-0592); Hostaperm Blue B2G-D (Clariant); Permanent Red P-F7RK; Hostaperm Violet BL (Clariant); Pigment Red 202 (Bayer); Lithol Scarlet 4440 (BASF); Bon Red C (Dominion Color Company); Oracet Pink RF (Ciba); Paliogen Red 3871 K (BASF); Sunfast Blue 15:3 (Sun Chemical 249-1284); Paliogen Red 3340 (BASF); Sunfast Carbazole Violet 23 (Sun Chemical 246-1670); Lithol Fast Scarlet L4300 (BASF); Sunbrite Yellow 17 (Sun Chemical 275-0023); Heliogen Blue L6900, L7020 (BASF); Sunbrite Yellow 74 (Sun Chemical 272-0558); Spectra Pac C Orange 16 (Sun Chemical 276-3016); Heliogen Blue K6902, K6910 (BASF); Sunfast Magenta 122 (Sun Chemical 228-0013); Heliogen Blue D6840, D7080 (BASF); Sudan Blue OS (BASF); Neopen Blue FF4012 (BASF); PV Fast Blue B2GO1 (Clariant); Irgalite Blue BCA (Ciba); Paliogen Blue 6470 (BASF); Sudan Orange G (Aldrich), Sudan Orange 220 (BASF); Paliogen Orange 3040 (BASF); Paliogen Yellow 152, 1560 (BASF); Lithol Fast Yellow 0991 K (BASF); Paliotol Yellow 1840 (BASF); Novoperm Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); Hostaperm Pink E 02 (Clariant); Hansa Brilliant Yellow 5GX03 (Clariant); Permanent Yellow GRL 02 (Clariant); Permanent Rubine L6B 05 (Clariant); Fanal Pink D4830 (BASF); Cinquasia Magenta (Du Pont), Paliogen Black L0084 (BASF); Pigment Black K801 (BASF); and carbon blacks such as REGAL 330™ (Cabot), Carbon Black 5250, Carbon Black 5750 (Columbia Chemical), mixtures thereof and the like. Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, and 7,053,227, the disclosures of each of which are totally incorporated herein by reference.

The colorant is present in the phase change ink in any desired or effective amount to obtain the desired color or hue, in one embodiment at least about 0.1% by weight of the ink, in another embodiment at least about 0.2% by weight of the ink, and in a further embodiment at least about 0.5% by weight of the ink, and in one embodiment equal to or less than about 30% by weight of the ink, in another embodiment equal to or less than about 20% by weight of the ink, and in a further embodiment equal to or less than about 10% by weight of the ink, although the amount can be outside of these ranges.

The ink compositions disclosed herein in one embodiment have melting points in one embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The ink compositions prepared by the process disclosed herein generally have melt viscosities, at the jetting temperature which can be equal to or less than about 145° C., in one embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 cps, in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

Showthrough is defined herein as the increase in paper OD (background subtracted) that results from the presence of a solid area image on the reverse side of the paper.

With regard to the subject inks, showthough can be substantially reduced so that the printed image in one embodiment is equal to or less than about 0.07 optical density units, in another embodiment is equal to or less than about 0.06 optical density units, in a further embodiment is equal to or less than about 0.05 optical density units, and in a yet further embodiment is equal to or less than about 0.04 optical density units, although the level of showthrough can be outside of these ranges.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195, 430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

Specific embodiments will now be described in detail. These examples are intended to be illustrative, and the claims are not limited to the materials, conditions, or process parameters set forth in these embodiments.

EXAMPLE I

Synthesis of Bis [4-(vinyloxy)butyl]trimethyl-1,6-hexanediylbiscarbamate (mixture of 2,2,4- and 2,4,4-isomers)

To a 2 L three neck flask equipped with a stopper, dropping funnel, stir bar, and reflux condenser was added trimethyl-1, 6-diisocyanatohexane (mixture of 2,2,4- and 2,4,4-isomers, 118.7 g, 0.57 mol, obtained from Sigma-Aldrich, Milwaukee, Wis.), dibutyltin dilaurate (3.56 g, 5.6 mmol, obtained from Sigma-Aldrich) and anhydrous tetrahydrofuran (1 L). 1,4-Butanediol vinyl ether (133.2 g, 1.2 mol, obtained from Sigma-Aldrich) was added slowly dropwise to the stirring solution via the addition funnel. The reaction mixture was brought to reflux and was kept at this temperature until deemed complete by infrared spectroscopy (about 5 hours, confirmed by the disappearance of the isocyanate peak at 2200 $cm^{-1}$). When the reaction was complete, methanol (500 mL) was added to quench any residual isocyanate and the solution was stirred for 0.5 hour. The solvent was stripped in vacuo and the residual oil was triturated with hexane (3×500 mL), dissolved in methylene chloride (1 L), washed with water (1×750 mL), dried over anhydrous magnesium sulfate, filtered, and concentrated in vacuo to afford 221 g of a pale yellow oil (89 percent yield). The product was believed to be a mixture of compounds of the formulae

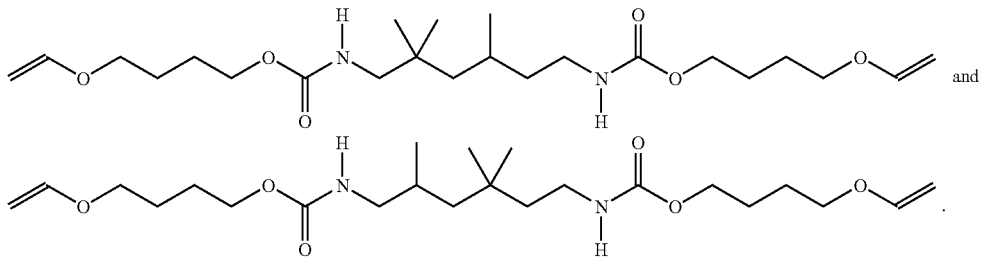

$^1$H NMR (300 MHz, CDCl$_3$): δ6.47 (2H, dd, J=14.3, 6.8 Hz), 4.88-4.62 (2H, br. m), 4.19 (2H, dd, J=14.3, 1.8 Hz), 4.09 (4H, br. s), 4.00 (2H, dd, J=6.8, 1.8 Hz), 3.70 (4H, br. s), 3.18-2.91 (4H, m), 1.72-1.01 (13H, m), 1.01-0.88 (9H, m).

EXAMPLE II

Compounds of the formula

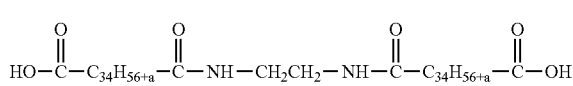

wherein —C$_{34}$H$_{56+a}$— represents a branched alkylene group which may include unsaturations and cyclic groups, wherein a is an integer of (1, 2, 3, 4, 5, 6, 7, 8, 9, 10, 11, or 12, including (but not limited to) isomers of the formula

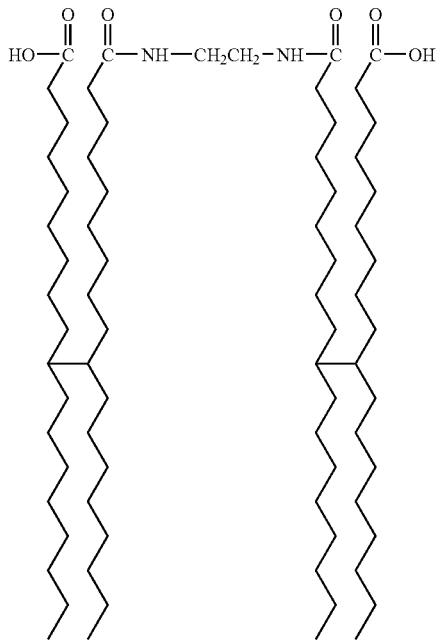

were prepared as follows. To a 4 neck, 1 L reaction kettle equipped with a thermocouple, overhead stirrer, stopper, Dean-Stark trap, reflux condenser, and argon inlet was added PRIPOL® 1009 (C36 dimer acid mixture, including isomers of the formula

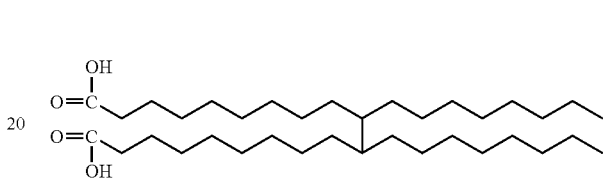

as well as other branched isomers which may include unsaturations and cyclic groups; 850 g, acid number 196 mgKOH/g, 95 wt %, obtained from Uniqema, New Castle, Del.; further information on C36 dimer acids of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference) and IRGAFOS® 168 (tris(2,4-di-(tert)-butylphenyl) phosphate, 1.79 g, 0.2 wt %, obtained from Ciba Specialty Chemicals, Basel, Switzerland). The system was purged with Ar for 15 minutes with one of the necks open, after which time the stopper was replaced. The temperature was set to 100° C. and the stirrer was set in motion. The stopper was quickly replaced with an addition funnel equipped with a septum, and ethylene diamine (EDA, 44.6 g, 49.6 mL, 5 wt %, obtained from Sigma-Aldrich Chemical Company, Milwaukee, Wis.) was added via syringe. The EDA was added to the reaction mixture slowly dropwise, ensuring that the internal reaction temperature did not exceed 118° C. After the addition was complete, the temperature was raised slowly stepwise to 155° C., where it was kept until water ceased collecting in the Dean-Stark trap (about 14 mL H$_2$O collected; reaction time was 2-3 h at 155° C.). The completion of the reaction was confirmed by $^1$H NMR analysis in CDCl$_3$: the triplet at δ2.34, corresponding to the protons alpha to the carboxylic acid groups, and the triplet at δ2.18, corresponding to the protons alpha to the carbonyl groups of the amides, were in approximately a 1:1 ratio. At the end of the reaction, the temperature was lowered to 130° C. and the clear, amber oil was poured from the reaction kettle into aluminum plates (recovered m=867 g). Acid number=94.8 mgKOH/g. $^1$H NMR (CDCl$_3$, 300 MHz) δ3.38 (4H, br. s), 2.53 (2H, br. s), 2.34 (4H, t, J=7.3 Hz), 2.18 (4H, t, J=7.6 Hz), 1.88-0.65 (136H, m).

EXAMPLE III
Compounds of the formula
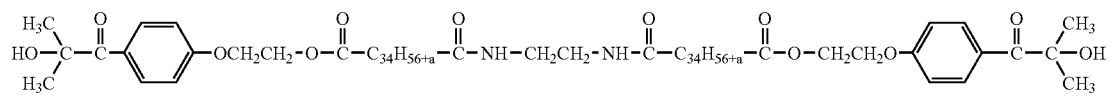
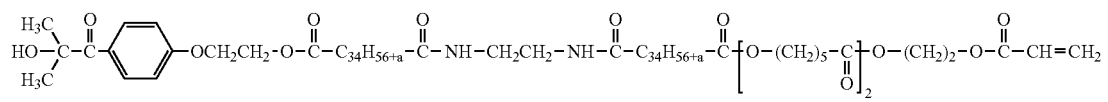
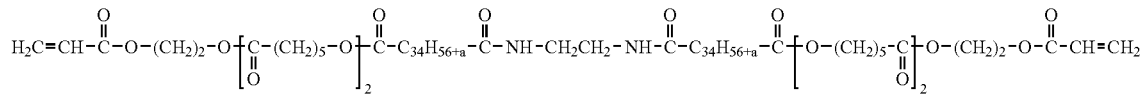
wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, including (but not limited to) isomers of the formula
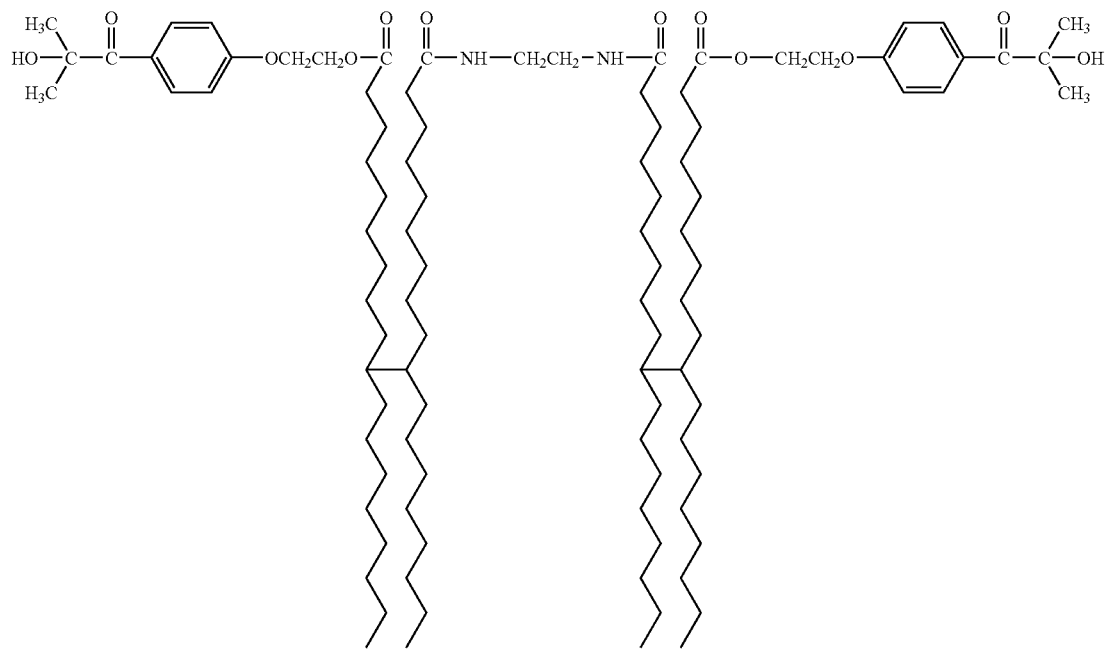

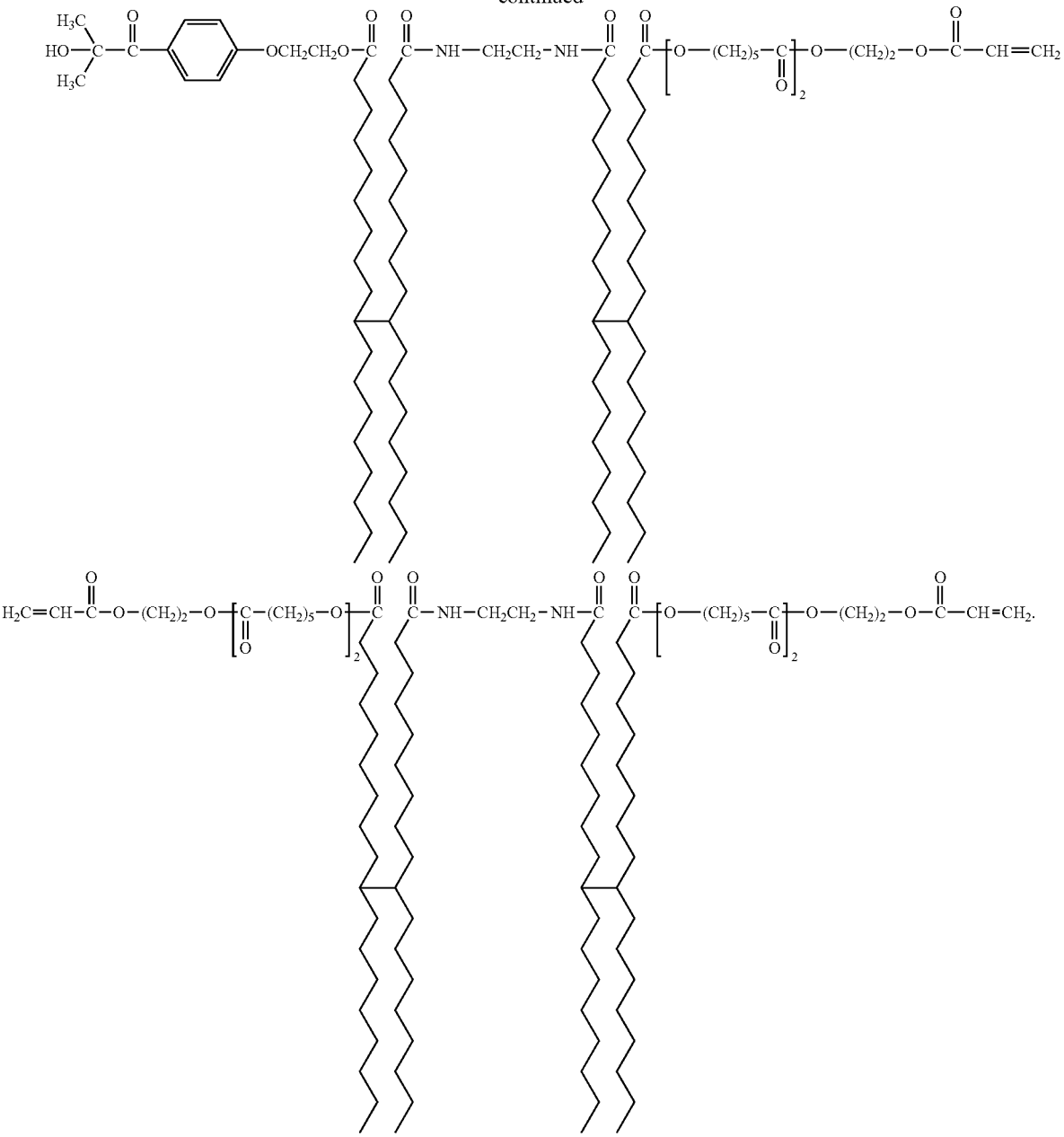

were prepared as follows. To a 3 neck, 2 L flask equipped with two dropping funnels, stir bar and argon inlet was added the organoamide prepared in Example II (50 g, acid number 94.8, $n_{acid}$ 8.45×10$^{-2}$ mol), 4-dimethylaminopyridine (1.03 g, 8.45×10$^{-3}$ mol, obtained from Sigma-Aldrich Chemical Company, Milwaukee, Wis.), and methylene chloride (850 mL) and the reaction mixture was stirred until homogenous. 1,3-Dicyclohexylcarbodiimide (101 mL, 1 M solution in $CH_2Cl_2$, 1.01×10$^{-1}$ mol, obtained from Sigma-Aldrich Chemical Company, Milwaukee, Wis.) was added slowly dropwise and the reaction mixture was allowed to stir for 0.5 h before adding caprolactone acrylate (TONE® M100, 14.52 g, 4.22×10$^{-2}$ mol. obtained from Dow Chemical Co., Midland, Mich.) slowly dropwise concurrently with 1-(4-(2-hydroxyethoxy)phenyl)-2-hydroxy-2-methylpropan-1-one (IRGACURE® 2959; 9.47 g, 4.22×10$^{-2}$ mol; obtained from Ciba Specialty Chemicals, Basel, Switzerland) portionwise. The reaction progress was followed via $^1$H NMR spectroscopy in $CDCl_3$: when the signals corresponding to the methylene protons from both alcohols (m, ca. δ3.74 from diethylene glycol methyl ether and m, ca. δ4.03 from 1-(4-(2-hydroxyethoxy)phenyl)-2-hydroxy-2-methylpropan-1-one) were consumed, the reaction was complete. The reaction time was typically between 2-3 h. The reaction mixture was filtered to remove N,N'-dicyclohexylurea (byproduct) and the filtrate solvent was removed in vacuo. Methanol (250 mL) was added to the residue and a biphasic mixture formed that was transferred to a separatory funnel. The bottom layer was removed, dissolved in $CH_2Cl_2$ (250 mL), dried over $MgSO_4$ and filtered. The solvent was removed in vacuo to reveal a sticky, pale yellow solid (47.1 g). ¹H NMR (CDCl₃, 300 MHz) δ8.08 (2H, d, J=8.7 Hz), 6.97 (2H, d, J=8.7 Hz), 6.47 (1H, d, J=17.4 Hz), 6.15 (1H, dd, J=17.4, 10.4 Hz), 5.89 (1H, d, J=10.4 Hz), 4.47 (2H, t, J=4.6 Hz), 4.40-4.23 (6H, m), 4.08 (4H, t, J=6.6 Hz), 3.37 (4H, s), 2.69-2.45 (3H, br. s), 2.45-2.26 (8H, m), 2.19 (4H, t, J=7.3 Hz), 1.99-0.83 (160H, m).

EXAMPLE IV

Synthesis of Epoxy-Polyamide Composite Gellant

In a 200 mL round bottom flask equipped with reflux condenser, thermometer and addition funnel, was charged a bisphenol A-co-epichlorohydrin epoxy resin commercially available from Dow Chemical as DER 383 resin (10.0 g, or 40% by weight of total material), a polyamide resin VERSA-MID 795 available from Cognis Corp. (10.0 g, or 40% by weight), and triphenylphosphine as catalyst (0.0875 g, or 0.35% by weight). The mixture was heated to 90° C. and stirred for 1 hour, after which time was first added a prepared solution of acrylic acid (2.58 g, 10.35% by weight) and 4-methoxyphenol as polymerization inhibitor (0.0125 g, 0.05% by weight), followed with a second prepared solution containing lauric acid (1.0625 g, 4.25% by weight) and triphenylphosphine (0.0875 g, 0.35% by weight). The temperature of the reaction mixture was increased to 115° C. and stirred for an additional 3 hours, thereby forming the acrylate-modified epoxy-polyamide composite gellant. The product was obtained as a clear, pale yellow gelatinous material.

INK EXAMPLE I

To an aluminum pan was added 88.6 g of bis[4-(vinyloxy) butyl] trimethyl-1,6-hexanediylbiscarbamate (mixture of 2,2, 4- and 2,4,4-isomers) and 15.0 g of R-GEN® BF-1172 (cationic photoinitiator; substituted triarylsulfonium hexafluorophosphate salt in propylene carbonate as a 40% solution; obtained from Chitec Chemical Co., Ltd., Taiwan, R.O.C.). The mixture was stirred at 100° C. until homogenous (about 0.5 hour). The temperature was then raised to 110° C., 45.0 g of 1-octadecanol (obtained from Sigma-Aldrich, Milwaukee, Wis.) was added, and the reaction mixture was stirred until homogeneous (about 15 minutes), after which time 1.52 g of Red Olefin Dye 24900 (obtained from Eastman Chemical Company, Kingsport, Tenn.) was added and the reaction mixture was stirred for an additional 1 hour.

INK EXAMPLE II

To a beaker was added 7.5 g of the amide gellant synthesized in Example III and 70.8 g of SR9003 (propoxylated neopentyl glycol diacrylate, obtained from Sartomer Co. Inc., Exton, Pa.). The mixture was stirred at 90° C. for 1 h. The resulting solution was filtered to 0.22 µm at 90° C., let cool to RT overnight, remelted and filtered to 0.22 µm at 90° C. To the resulting solution was added 3.0 g Irgacure 379 (2-dimethylamino-2-(4-methylbenzyl)-1-(4-morpholin-4-ylphenyl)-butanone; obtained from Ciba Specialty Chemicals, Tarrytown, N.Y.), 2.0 g Darocur ITX (Isopropyl-9H-thioxanthen-9-one; obtained from Ciba Specialty Chemicals, Tarrytown, N.Y.), 1.0 g Irgacure 819 (bis(2,4,6-trimethylbenzoyl)-phenyl-phosphine oxide; obtained from Ciba Specialty Chemicals, Tarrytown, N.Y.), 3.5 g Irgacure 127 (2-Hydroxy -1-(4-(4-(2-hydroxy-2-methylpropionyl)-benzyl)-phenyl)-2-methylpropan-1-one; obtained from Ciba Specialty Chemicals, Tarrytown, N.Y.) and 0.2 g Irgastab UV 10 (obtained from Ciba Specialty Chemicals, Tarrytown, N.Y.) and the entire solution was stirred for 1 h at 90° C. The ink base was filtered to 0.22 µm and the hot solution (90° C.) was added dropwise to a stirring solution of 12.0 g of a blue pigment dispersion (25 wt %, obtained from Sun Chemical, Parsippany, N.J.), also at 90° C. The resulting ink was filtered to 6 µm.

INK EXAMPLE III

While stirring at 90° C., the epoxy-polyamide composite gellant synthesized in Example IV (8 parts) was first dissolved in SR9003 (propoxylated neopentylglycol diacrylate, 29.8 parts) and caprolactone acrylate (15 parts) to which was added a mixture of photoinitiators consisting of 2-hydroxy-1-(4-(4-(2-hydroxy-2-methylpropionyl)-benzyl)-phenyl)-2-methylpropan-1-one (3.5 parts), 2-dimethylamino-2-(4-methylbenzyl)-1-(4-morpholin-4-ylphenyl)-butanone (3 parts), bis(2,4,6-trimethylbenzoyl)-phenyl-phosphine oxide (1 part) and isopropyl-9H-thioxanthen-9-one (2 parts) followed by IRGASTAB UV 10 (0.2 parts) obtained from Ciba Specialty Chemicals, followed lastly by 37.5 parts Pigment Red 202 dispersion consisting 86.67 percent propoxylated neopentylglycol diacrylate, 8% Pigment Red 202 (Bayer Corporation, Rockhill, S.C.) and 5.9% Solsperse 34750.

INK EXAMPLES IV TO VI

A number of phase change carriers and inks containing substantially non aggregated silica nanoparticles are prepared by a solvent exchange process in which 1) silica nanoparticles dispersed in a low boiling point solvent are added slowly to Ink Examples I to III while maintening the temperature just below the boiling point of the solvent; 2) the solvent is removed slowly by stirring the carrier or ink at about the boiling poing of the solvent.

INK EXAMPLE IV

To an aluminum pan was added 88.6 g of bis[4-(vinyloxy) butyl]trimethyl-1,6-hexanediylbiscarbamate (mixture of 2,2, 4- and 2,4,4-isomers) and 15.0 g of R-GEN® BF-1172 (cationic photoinitiator; substituted triarylsulfonium hexafluorophosphate salt in propylene carbonate as a 40% solution; obtained from Chitec Chemical Co., Ltd., Taiwan, R.O.C.). The mixture was stirred at 100° C. until homogenous (about 0.5 hour). The temperature was then raised to 110° C., 45.0 g of 1-octadecanol (obtained from Sigma-Aldrich, Milwaukee, Wis.) was added, and the reaction mixture was stirred until homogeneous (about 15 minutes), after which time 1.52 g of Red Olefin Dye 24900 (obtained from Eastman Chemical Company, Kingsport, Tenn.) was added and the reaction mixture was stirred for an additional 1 hour. The temperature was then reduced to about 75-80 degree C. and 43.54 g of a silica dispersion in methyl ethyl ketone (MEK) (MEK-ST Organosilicasol™, obtained from Nissan Chemicals Industry, about 13.06 grams of dry silica nanoparticles, was slowly added. The resulting solvent-containing dispersion was stirred for 2 hours at about 80 degree C., the MEK solvent being slowly evaporated to yield a silica containing organic phase change ink.

INK EXAMPLE V

To a beaker was added 7.5 g of the amide gellant synthesized in Example III and 70.8 g of SR9003 (propoxylated neopentyl glycol diacrylate, obtained from Sartomer Co. Inc., Exton, Pa.). The mixture was stirred at 90° C. for 1 h. The resulting solution was filtered to 0.22 µm at 90° C., let cool to RT overnight, remelted and filtered to 0.22 µm at 90° C. To the resulting solution was added 3.0 g Irgacure 379 (2-dimethylamino-2-(4-methylbenzyl)-1-(4-morpholin-4-ylphenyl)-butanone; obtained from Ciba Specialty Chemicals, Tarrytown, N.Y.), 2.0 g Darocur ITX (Isopropyl-9H-thioxanthen-9-one; obtained from Ciba Specialty Chemicals, Tarrytown, N.Y.), 1.0 g Irgacure 819 (bis(2,4,6-trimethylbenzoyl)-phenyl-phosphine oxide; obtained from Ciba Specialty Chemicals, Tarrytown, N.Y.), 3.5 g Irgacure 127 (2-Hydroxy-1-(4-(4-(2-hydroxy-2-methylpropionyl)-benzyl)-phenyl)-2-methylpropan-1-one; obtained from Ciba Specialty Chemicals, Tarrytown, N.Y.) and 0.2 g Irgastab UV 10 (obtained from Ciba Specialty Chemicals, Tarrytown, N.Y.) and the entire solution was stirred for 1 h at 90° C. The ink base was filtered to 0.22 µm and the hot solution (90° C.) was added dropwise to a stirring solution of 12.0 g of a blue pigment dispersion (25 wt %, obtained from Sun Chemical, Parsippany, N.J.), also at 90° C. The temperature was then reduced to about 75-80 degree C. and 43.54 g of a silica dispersion in methyl ethyl ketone (MEK) (MEK-ST Organosilicasol™, obtained from Nissan Chemicals Industry, about 13.06 grams of dry silica nanoparticles, was slowly added. The resulting solvent-containing dispersion was stirred for 2 hours at about 80 degree C., the MEK solvent being slowly evaporated to yield a silica containing organic phase change ink. The resulting ink was filtered to 6 µm.

INK EXAMPLE VI (Part A) A silica containing carrier was prepared as follows: (1) To a 200 ml beaker was added 90 parts of SR9003 (propoxylated neopentylglycol diacrylate) and then slowly added 43.54 g of a silica dispersion in methyl ethyl ketone (MEK) (MEK-ST Organosilicasol™, obtained from Nissan Chemicals Industry, about 13.06 grams of dry silica nanoparticles, the temperature being maintained at about 75-80 degree C.; (2) the resulting solvent-containing vehicle was stirred for 2 hours at about 80 degree C., the MEK solvent being slowly evaporated to yield a silica-containing SR9003 carrier.

(Part B) While stirring at 90° C., the epoxy-polyamide composite gellant synthesized in Example IV (8 parts) was first dissolved in the SR9003 carrier of part A (29.8 parts) and caprolactone acrylate (15 parts) to which was added a mixture of photoinitiators consisting of 2-hydroxy-1-(4-(4-(2-hydroxy-2-methylpropionyl)-benzyl)-phenyl)-2-methylpropan-1-one (3.5 parts), 2-dimethylamino-2-(4-methylbenzyl)-1-(4-morpholin-4-ylphenyl)-butanone (3 parts), bis(2,4,6-trimethylbenzoyl)-phenyl-phosphine oxide (1 part) and isopropyl-9H-thioxanthen-9-one (2 parts) followed by IRGASTAB UV 10 (0.2 parts) obtained from Ciba Specialty Chemicals, followed lastly by 37.5 parts Pigment Red 202 dispersion consisting 86.67 percent propoxylated neopentylglycol diacrylate, 8% Pigment Red 202 (Bayer Corporation, Rockhill, S.C.) and 5.9% Solsperse 34750.

INK EXAMPLE VII

To a glass beaker was added (1) 59.35 grams of bis[4-(vinyloxy)butyl]trimethyl-1,6-hexanediylbiscarbamate (mixture of 2,2,4- and 2,4,4-isomers); (2) 12.49 grams of bis[4-(vinyloxy)butyl]dodecanedioate, and then slowly (3) 43.54 g of a silica dispersion in methyl ethyl ketone (MEK) (MEK-ST Organosilicasol™, obtained from Nissan Chemicals Industry, about 13.06 grams of dry silica nanoparticles, the temperature being maintained at about 75-80 degree C.; (4) the resulting solvent-containing dispersion was stirred for 2 hours at about 80 degree C., the MEK solvent being slowly evaporated to yield a silica-containing monomer mixture. To this monomer mixture was added (5) 8.29 grams of R-GEN® BF-1172 (cationic photoinitiator; substituted triarylsulfonium hexafluorophosphate salt in propylene carbonate as a 40% solution; obtained from Chitec Chemical Co., Ltd., Taiwan, R.O.C.); (6) 11.45 grams of VEctomer® 5015 (obtained from Sigma-Aldrich, Milwaukee, Wis.) and (7) 12.50 grams of 1-octadecanol (obtained from Sigma-Aldrich). The resulting mixture was further heated with stirring at 100° C. until visually homogenous (about 1 hour). At this point, 0.94 grams of Neopen Blue 808 dye (obtained from BASF Aktiengesellschaft, Ludwigshafen, Germany) was added and the mixture was stirred with heating for an additional 1 hour.

INK EXAMPLE VIII

To a glass beaker was added 55.82 grams of bis[4-(vinyloxy)butyl]trimethyl-1,6-hexanediylbiscarbamate (mixture of 2,2,4- and 2,4,4-isomers), 10.93 grams of bis[4-(vinyloxy)butyl]dodecanedioate and 31.74 grams of hydrogenated Castor oil (obtained from Campbell and Co., Charlemont, Mass.). The mixture was heated at 110° C. until all ingredients dissolved (about 0.5 hour). The temperature was then lowered to 100° C., 10.95 grams of R-GEN® BF-1172 (cationic photoinitiator; substituted triarylsulfonium hexafluorophosphate salt in propylene carbonate as a 40% solution; obtained from Chitec Chemical Co., Ltd., Taiwan, R.O.C.) was added, and the reaction mixture was stirred until homogeneous (about 0.5 hour). The temperature was then reduced to about 75-80 degree C. and 43.54 g of a silica dispersion in methyl ethyl ketone (MEK) (MEK-ST Organosilicasol™, obtained from Nissan Chemicals Industry, about 13.06 grams of dry silica nanoparticles, was slowly added. The resulting solvent-containing dispersion was stirred for 2 hours at about 80 degree C., the MEK solvent being slowly evaporated to yield a silica containing organic phase change carrier. At this point, 0.55 grams of Red Olefin Dye 24900 (obtained from Eastman Chemical Company, Kingsport, Tenn.) was added and the mixture was stirred with heating for an additional 1 hour.

INK EXAMPLE IX

To a glass beaker was added 67.49 grams of bis[4-(vinyloxy)butyl]trimethyl-1,6-hexanediylbiscarbamate (mixture of 2,2,4- and 2,4,4-isomers), 6.25 grams of VEctomer® 3080 (obtained from Sigma-Aldrich, Milwaukee, Wis.), and 12.54 grains of R-GEN® BF-1172 (cationic photoinitiator; substituted triarylsulfonium hexafluorophosphate salt in propylene carbonate as a 40% solution; obtained from Chitec Chemical Co., Ltd., Taiwan, R.O.C.). The reaction mixture was heated at 90° C. with stirring until homogeneous (about 15 minutes). At this point, the temperature was raised to 100° C., 37.50 grams of 1-octadecanol was added, and the mixture was stirred until homogeneous (about 0.5 hour). The temperature was then reduced to about 75-80 degree C. and 43.54 g of a silica dispersion in methyl ethyl ketone (MEK) (MEK-ST Organosilicasol™, obtained from Nissan Chemicals Industry, about 13.06 grams of dry silica nanoparticles, was slowly added. The resulting solvent-containing dispersion was stirred for 2 hours at about 80 degree C., the MEK solvent being slowly evaporated to yield a silica containing organic phase change carrier. At this point, 1.25 grams of Blue Olefin Dye 24316 (obtained from the Eastman Chemical Company, Kingsport, Tenn.) was added and the formulation was stirred for 1 hour longer.

The nanoparticles containing inks of the invention can be obtained by variations of the process described in Ink Examples IV to IX; in specific embodiments, the nanoparticles are added to all or part of the phase change vehicle prior to the addition of the colorant. If the nanoparticles are dispersed in a low boiling point solvent, said solvent is evaporated before the addition of the colorant, optionally the initiator and/or phase change inducing component can be added after the nanoparticles are added to the vehicles. When self-dispersible nanoparticles are selected, these nanoparticles are dispersed in the vehicle prior to the addition of the other ink components, optionally high shear mixing and/or ultrasound and/or dispersants are used to assist in the dispersion of the nanoparticles into the ink.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An organic phase change carrier comprising (A) a colloidal dispersion of nanoparticles exhibiting a substantially uniform distribution of said nanoparticles discretely distributed therewithin; (B) at least one curable monomer; (C) a phase change inducing component comprising at least one of a gellant and a solid alcohol compound, said gellant comprising a curable epoxy-polyamide composite; and (D) an initiator, said organic phase change carrier being resistant to substantial aggregation of said nanoparticles distributed therewithin.

2. A phase change ink comprising a colorant and the organic phase change carrier according to claim 1.

3. An organic phase change carrier according to claim 1, wherein said nanoparticles comprise at least one of silica particles and metal oxide particles.

4. An organic phase change carrier according to claim 3, wherein said metal oxide nanoparticles comprise aluminium oxide, antimony tin oxide, antimonyl pentoxide, and zinc oxide.

5. An organic phase change carrier according to claim 1, wherein said nanoparticles comprise tecton-modified silica nanoparticles.

6. An organic phase change carrier according to claim 1, wherein said curable epoxy-polyamide composite gellant is derived from an epoxy-group containing component comprising at least one of polyphenol-based epoxy resins, polyol-based epoxy resins or fatty acid epoxides, and a polyamide component.

7. An organic phase change carrier according to claim 1, wherein the solid alcohol compound comprises hydrogenated castor oil.

8. An organic phase change carrier according to claim 1, wherein the colloidal dispersion of nanoparticles is present in the organic phase change carrier in an amount equal to or less than about 45% by weight.

9. An organic change ink according to claim 2, wherein the phase change inducing component is present in the organic phase change carrier in an amount of from about 5% equal to or less than about 50% by weight.

10. An organic phase change carrier according to claim 1, wherein the gellant is present in the organic phase change carrier in an amount equal to or less than about 50% by weight.

11. An organic phase change carrier according to claim 1, wherein the nanoparticles align along the network formed by the phase change inducing agent.

12. An organic phase change carrier according to claim 1, wherein the surface properties of at least a portion of the nanoparticles are chemically modified so as to produce ink particle composites that have gel-like properties at temperatures below about 40 degree C.

13. An organic phase change carrier according to claim 1, wherein the surface properties of at least a portion of the nanoparticles are chemically modified so as to produce functionalized nanoparticles that are UV or thermally curable.

14. An organic phase change carrier according to claim 1, wherein the monomer is the reaction product of a mixture comprising (1) an isocyanate; and (2) a component comprising (a) an alcohol having at least one ethylenic unsaturation, and (b) an amine having at least one ethylenic unsaturation.

15. An organic phase change carrier according to claim 1, wherein the monomer is the reaction product of a mixture comprising (1) an isocyanate; and (2) a component comprising an acid having at least one ethylenic unsaturation.

16. An organic phase change carrier according to claim 10, wherein the monomer is the reaction product of a mixture comprising (1) an isocyanate; and (2) a component comprising an alcohol having at least one ethylenic unsaturation.

17. An organic phase change carrier according to claim 1, wherein the monomer is propoxylated neopentyl diacrylate, isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, or mixtures thereof.

18. An organic phase change carrier according to claim 13, wherein the monomer is the reaction product of a mixture comprising (1) an isocyanate; and (2) a component comprising a mixture of(a) an alcohol having at least one ethylenic unsaturation and (b) an amine having at least one ethylenic unsaturation.

19. An organic phase change carrier according to claim 1, wherein said nanoparticles are substantially optically transparent.

20. An organic phase change carrier according to claim 1, wherein substantially all of said nanoparticles do not precipitate.

21. A method which comprises (a) incorporating into an ink jet printing apparatus a low energy phase change ink composition comprising (1) an organic phase change carrier comprising (A) a colloidal dispersion of nanoparticles exhibiting a substantially uniform distribution of said nanoparticles discretely distributed therewithin, and having a substantial resistance to aggregation of said nanoparticles distributed therewithin; (B) a curable or mixture of curable monomers; (C) a phase change inducing component comprising at least one of a gellant and a solid alcohol compound, said gellant comprising a curable epoxy-polyamide composite; and (D) an initiator, and (2) (a) a colorant; (b) heating the low energy phase change ink composition to a predefined jetting temperature; and (c) causing droplets of the liquid ink to be ejected in an imagewise pattern onto a substrate.

22. A method according to claim 21, wherein the substrate is a final recording sheet and droplets of the liquid ink are ejected in an imagewise pattern directly onto the final recording sheet.

23. A method according to claim 21, wherein the substrate is an intermediate transfer member and droplets of the liquid ink are ejected in an imagewise pattern onto the intermediate transfer member followed by transfer of the imagewise pattern from the intermediate transfer member to a final recording sheet.

24. A method according to claim 23, wherein the intermediate transfer member is heated to a temperature above that of the final recording sheet and below that of the jetting temperature set point of the printing apparatus.

25. The method according to claim 21, which further includes chemically modifying the surface properties of at least a portion of the nanoparticles so as to produce ink particle composites that have gel-like properties.

26. A method for producing a low energy phase change ink composition comprising combining together (1) an organic phase change carrier comprising (A) a colloidal dispersion of nanoparticles, (B) a curable or mixture of curable monomers; (C) a phase change inducing component comprising at least one of a gellant and a solid alcohol compound, said gellant comprising a curable epoxy-polyamide composite; and (D) an initiator, the carrier exhibiting a substantially uniform distribution of said nanoparticles discretely distributed therewithin, and having a substantial resistance to aggregation of said nanoparticles distributed therewithin; and (2) a colorant.

27. An organic phase change carrier according to claim 26, wherein said nanoparticles comprise at least one of silica particles and metal oxide particles.

28. An organic phase change carrier according to claim 26, wherein said nanoparticles comprise tecton-modified silica nanoparticles.

* * * * *